United States Patent
Lee et al.

(10) Patent No.: US 10,942,606 B2
(45) Date of Patent: Mar. 9, 2021

(54) TOUCH SENSING DEVICE OF CURRENT DRIVING TYPE

(71) Applicant: SILICON WORKS CO., LTD., Daejeon (KR)

(72) Inventors: Hee Jin Lee, Daejeon (KR); Jae Hwan Lee, Daejeon (KR); Jeong Kwon Nam, Daejeon (KR); Kyu Tae Lee, Daejeon (KR); Hyun Soo Chung, Daejeon (KR); Jin Yoon Jang, Daejeon (KR); Hee Ra Yun, Daejeon (KR); Kyung Min Shin, Daejeon (KR); Mun Seok Kang, Daejeon (KR)

(73) Assignee: SILICON WORKS CO., LTD., Daejeon (KR)

( * ) Notice: Subject to any disclaimer, the term of this patent is extended or adjusted under 35 U.S.C. 154(b) by 0 days.

(21) Appl. No.: 16/718,658

(22) Filed: Dec. 18, 2019

(65) Prior Publication Data

US 2020/0210046 A1  Jul. 2, 2020

(30) Foreign Application Priority Data

Dec. 27, 2018  (KR) .................. 10-2018-0171297

(51) Int. Cl.
*G06F 3/041* (2006.01)
*G06F 3/044* (2006.01)

(52) U.S. Cl.
CPC .......... *G06F 3/04186* (2019.05); *G06F 3/044* (2013.01); *G06F 3/0445* (2019.05); *G06F 3/04182* (2019.05)

(58) Field of Classification Search
CPC ...... G06F 3/044; G06F 3/0412; G06F 3/0416; G06F 3/0418–04186; G06F 3/04182; G06F 3/04186; G06F 3/0445
See application file for complete search history.

(56) References Cited

U.S. PATENT DOCUMENTS

| 2016/0188041 | A1* | 6/2016 | Kim | G06F 3/0412 345/174 |
|---|---|---|---|---|
| 2017/0269779 | A1* | 9/2017 | Chan | G06F 3/04182 |
| 2018/0172744 | A1* | 6/2018 | Chang | H03K 17/962 |
| 2018/0173365 | A1* | 6/2018 | Dinu | G06F 3/0446 |

FOREIGN PATENT DOCUMENTS

| KR | 10-2015-0136982 A | 12/2015 |
|---|---|---|
| KR | 10-2016-0083405 A | 7/2016 |

* cited by examiner

*Primary Examiner* — Xuemei Zheng
(74) *Attorney, Agent, or Firm* — Harness, Dickey & Pierce, P.L.C.

(57) ABSTRACT

A touch sensing device of a current driving type, which separately drives a parasitic capacitor by using an electric charge controller, includes a parasitic capacitance charger connected to a touch sensing line to charge a parasitic capacitor of a touch electrode connected to the touch sensing line with a predetermined charging current during a charging period and a sensing unit connected to the touch sensing line during a first driving period to drive a capacitor of the touch electrode with a first driving current corresponding to a difference voltage between a first voltage, charged into the parasitic capacitor when a touch does not occur, and a second voltage charged into the parasitic capacitor when a touch occurs and to sense a first touch voltage of the capacitor based on the first driving current during a first sensing period.

20 Claims, 12 Drawing Sheets

TOUCH SENSING DEVICE OF CURRENT DRIVING TYPE

CROSS-REFERENCE TO RELATED APPLICATIONS

This application claims the benefit of the Korean Patent Application No. 10-2018-0171297 filed on Dec. 27, 2018, which is hereby incorporated by reference as if fully set forth herein.

FIELD

The present disclosure relates to a touch sensing device, and more particularly, to a touch sensing device for sensing a touch applied to a touch screen panel.

BACKGROUND

With the advancement of information-oriented society, various requirements for display apparatuses for displaying an image are increasing. Recently, various types of display apparatuses such as Liquid Crystal Display (LCD) and Organic Light Emitting Diode (OLED) display are being practically used.

Recently, display apparatuses including a touch screen panel for sensing a touch input based on a stylus pen or a finger of a user are being widely used without depending on conventional input manners such as buttons, keyboards, and mouse devices. The display apparatuses including the touch screen panel include a touch sensing device for accurately detecting the presence of a touch and touch coordinates (a touch position).

The touch sensing device drives touch electrodes disposed in the touch screen panel to detect a touch sensing signal and detects touch information such as the presence of a touch or a touch position by using the touch sensing signal.

In a related art touch sensing device, an undesired parasitic capacitance may occur between touch driving patterns and peripheral conductors at the inside or outside of a touch screen in a process of driving the touch screen to sense a touch. When a touch is sensed as a capacitive type in a state where a parasitic capacitance occurs inside or outside the touch screen panel, touch sensitivity may be greatly reduced due to the parasitic capacitance.

Recently, in plastic organic light emitting diode (pOLED) display apparatuses which are increasing in use for smartphones and the like, as a thickness of each smartphone is progressively thinned, a high parasitic capacitance occurs between a touch screen panel and a cathode electrode of a plastic OLED.

When a parasitic capacitance occurs as described above, an output of a sensing amplifier for sensing a touch may be saturated due to an offset caused by the parasitic capacitance, and due to this, a limitation may inevitably occur in an output range of the sensing amplifier.

In order to solve such a problem, a method of largely increasing a feedback capacitor of a sensing amplifier or adding an offset removal circuit to the inside of the sensing amplifier may be considered. However, when the feedback capacitor of the sensing amplifier increases, an output of the sensing amplifier decreases. When the offset removal circuit is added to the inside of the sensing amplifier, inter noise may be increased due to the offset removal circuit and it is difficult to obtain an output signal having a high signal noise ratio (SNR).

SUMMARY

Accordingly, the present disclosure is directed to providing a touch sensing device that substantially obviates one or more problems due to limitations and disadvantages of the related art.

An aspect of the present disclosure is directed to providing a touch sensing device of a current driving type, which separately drives a parasitic capacitor by using an electric charge controller.

Another aspect of the present disclosure is directed to providing a touch sensing device of a current driving type, which performs bidirectional sensing.

Another aspect of the present disclosure is directed to providing a touch sensing device of a current driving type, which improves a touch sensitivity.

Additional advantages and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these and other advantages and in accordance with the purpose of the disclosure, as embodied and broadly described herein, there is provided a touch sensing device of a current driving type, the touch sensing device including: a parasitic capacitance charger connected to a touch sensing line to charge a parasitic capacitor of a touch electrode connected to the touch sensing line with a predetermined charging current during a charging period; and a sensing unit connected to the touch sensing line during a first driving period to drive a capacitor of the touch electrode with a first driving current corresponding to a difference voltage between a first voltage, charged into the parasitic capacitor when a touch does not occur, and a second voltage charged into the parasitic capacitor when a touch occurs and to sense a first touch voltage of the capacitor based on the first driving current during a first sensing period, wherein the sensing unit applies a driving signal to the touch electrode through the touch sensing line prior to the charging period to allow a voltage of the touch electrode to become a third voltage having a level lower than a level of the first voltage.

In another aspect of the present disclosure, there is provided a touch sensing device of a current driving type, the touch sensing device including: an electric charge controller connected to a touch sensing line to charge a parasitic capacitor of a touch electrode connected to the touch sensing line with a predetermined charging current or discharge the parasitic capacitor by using a predetermined discharging current to control an amount of an electric charge of the parasitic capacitor; a buffer connected to the touch sensing line to drive a capacitor of the touch electrode with a driving current corresponding to a difference voltage between a voltage of the parasitic capacitor, having an amount of an electric charge controlled by the electric charge controller when a touch does not occur, and a voltage of the parasitic capacitor having an amount of an electric charge controlled by the electric charge controller when a touch occurs, and to output a touch voltage of the capacitor based on the driving current as a first current and a second current; a current mirror unit generating an output signal from a first mirror current generated by mirroring the first current and a second mirror current generated by mirroring the second current; and an integrator integrating a difference between a reference signal and the output signal to output an integral signal.

In another aspect of the present disclosure, there is provided a touch sensing device of a current driving type, the touch sensing device including: a plurality of electric charge controllers respectively connected to a plurality of touch sensing lines to charge a parasitic capacitor of a touch electrode connected to a corresponding touch sensing line of the plurality of touch sensing lines with a predetermined charging current or discharge the parasitic capacitor by using a predetermined discharging current to control an amount of an electric charge of the parasitic capacitor; a plurality of buffers respectively connected to the plurality of touch sensing lines to drive a capacitor of the touch electrode with a driving current corresponding to a difference voltage between a voltage of the parasitic capacitor, having an amount of an electric charge controlled by a corresponding electric charge controller when a touch does not occur, and a voltage of the parasitic capacitor having an amount of an electric charge controlled by a corresponding electric charge controller when a touch occurs, and to output a touch voltage of the capacitor based on the driving current as a first current and a second current; a plurality of current mirror units respectively connected to the plurality of buffers to each generate a first output signal from a first mirror current generated by mirroring the first current and a second mirror current generated by mirroring the second current and generate a second output signal from a third mirror current generated by mirroring the first current and a fourth mirror current generated by mirroring the second current; and a plurality of integrators integrating a difference between a second output signal output from an n-1$^{th}$ (where n is an integer of 2 or more) current mirror unit of the plurality of current mirror units and a first output signal output from an n$^{th}$ current mirror unit of the plurality of current mirror units to output an integral signal.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION

Figure 1A:
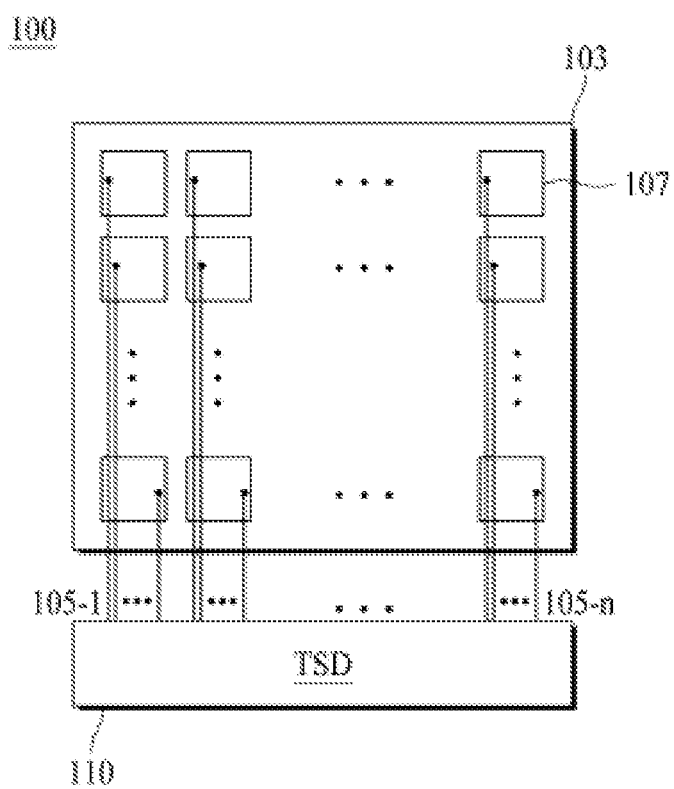
FIG. 1A is a block diagram of a display apparatus according to one embodiment of the present invention.

In the specification, it should be noted that like reference numerals already used to denote like elements in other drawings are used for elements wherever possible. In the following description, when a function and a configuration known to those skilled in the art are irrelevant to the essential configuration of the present disclosure, their detailed descriptions will be omitted. The terms described in the specification should be understood as follows.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted.

In a case where 'comprise', 'have', and 'include' described in the present specification are used, another part may be added unless 'only~' is used. The terms of a singular form may include plural forms unless referred to the contrary.

In construing an element, the element is construed as including an error range although there is no explicit description.

In describing a position relationship, for example, when a position relation between two parts is described as 'on~', 'over~', 'under~', and 'next~', one or more other parts may be disposed between the two parts unless 'just' or 'direct' is used.

In describing a time relationship, for example, when the temporal order is described as 'after~', 'subsequent~', 'next~', and 'before~', a case which is not continuous may be included unless 'just' or 'direct' is used.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

An X axis direction, a Y axis direction, and a Z axis direction should not be construed as only a geometric relationship where a relationship therebetween is vertical, and may denote having a broader directionality within a scope where elements of the present disclosure operate functionally.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

Hereinafter, embodiments of the present invention will be described in detail with reference to the accompanying drawings.

FIG. 1A is a block diagram of a display apparatus 100 according to an embodiment of the present invention. Referring to FIG. 1A, the display apparatus 100 may include a touch screen panel (TSP) 103 and a touch sensing device of a current driving type (hereinafter referred to as a touch sensing device) 110. In FIG. 1, for convenience of description, only the touch screen panel 103 and the touch sensing device 110 are illustrated, and the display apparatus 100 according to an embodiment of the present invention may further include general other elements (for example, a data driver (not shown), a gate driver (not shown), a timing controller (not shown), or a power supply (not shown)) for driving the display apparatus 100.

The display device 100 may be a mobile device, and the mobile device may be implemented as a laptop computer, a smartphone, a Mobile Internet device (MID), or an Internet of things (IoT) device. In an embodiment, the display device 100 may be a display apparatus including a plastic organic light emitting diode (pOLED) display panel.

The touch screen panel 103 may sense a touch applied to the touch screen panel 103 by using a capacitance type. In an embodiment, the touch screen panel 103 may be a self-capacitance touch screen panel 103 which senses a touch applied to the touch screen panel 103 by using a self-capacitance type. In an embodiment, the touch screen panel 103 may be implemented as a type embedded into the display apparatus 100. For example, the touch screen panel 103 may be disposed as an on-cell type in the display apparatus 100.

The touch screen panel 103 may include a plurality of touch electrodes 107 and a plurality of touch sensing lines 105-1 to 105-$n$ (where n is an integer of 2 or more).

The plurality of touch electrodes 107 may receive a touch performed by a touch object (a finger or a pen). The plurality of touch electrodes 107 may be arranged at predetermined intervals along a plurality of horizontal lines and a plurality of vertical lines. In an embodiment, a size of each of the plurality of touch electrodes 107 may be determined based on a contact area with the touch object. For example, when the touch screen panel 103 is the self-capacitance touch screen panel 103, the plurality of touch electrodes 107 may be provided to have a size which is greater than a minimum contact size between the touch object and the touch screen panel 103.

Each of the plurality of touch sensing lines 105-1 to 105-$n$ may transmit a touch driving signal to a touch electrode 107 connected to a corresponding touch sensing line and may transfer a voltage (or an electric charge), provided from a corresponding touch electrode 107, to a touch sensing device 110. To this end, the plurality of touch sensing lines 105-1 to 105-$n$ may be respectively and individually connected to the plurality of touch electrodes 107.

The touch sensing device 110 may perform a touch sensing function of sensing a touch applied to the touch screen panel 103. In an embodiment, the touch sensing device 110 may be a touch sensing device of a current driving type, which supplies a driving current to the touch electrodes 107 to drive the touch electrodes 107. The touch sensing device 110 of the current driving type may supply the driving current to the touch electrodes 107 through the touch sensing lines 105-1 to 105-$n$, and when a touch is applied, the touch sensing device 110 of the current driving type may sense a variation of a capacitance occurring in a corresponding touch electrode 107.

Figure 1B:
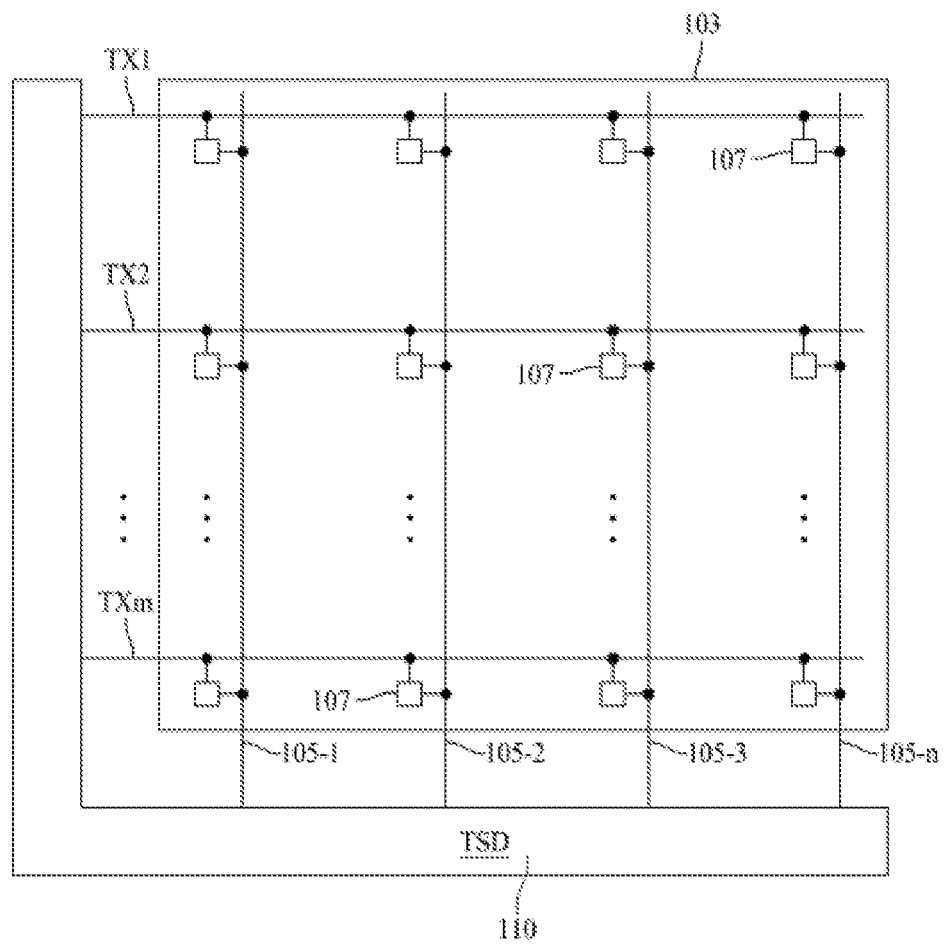
FIG. 1B is a block diagram of a display according to another embodiment of the present invention.

In FIG. 1A, the touch screen panel 103 has been described above as the self-capacitance touch screen panel 103 which is configured with only the touch electrodes 107 and the touch sensing lines 105-1 to 105-$n$ connected to the touch electrodes 107. In another embodiment, however, the touch screen panel 103 may be a mutual-capacitance touch screen panel 103 which further includes a plurality of touch driving lines TX1 to TXm (where m is an integer of 2 or more) as illustrated in FIG. 1B. In this case, each of the touch electrodes 107 may include a mutual capacitor.

Even when the touch screen panel 103 is the mutual-capacitance touch screen panel 103 as illustrated in FIG. 1B, the touch sensing device 110 according to an embodiment of the present invention may sense a touch by using a self-capacitance type. In the touch sensing device 110, the touch driving lines TX1 to TXm may be floated while a touch is being sensed by using the touch sensing lines 105-1 to 105-$n$, and the touch sensing lines 105-1 to 105-$n$ may be floated while a touch is being sensed by using the touch driving lines TX1 to TXm.

Hereinafter, a configuration of a touch sensing device according to a first embodiment of the present invention will be described in more detail with reference to FIGS. 2 and 3.

Figure 2:
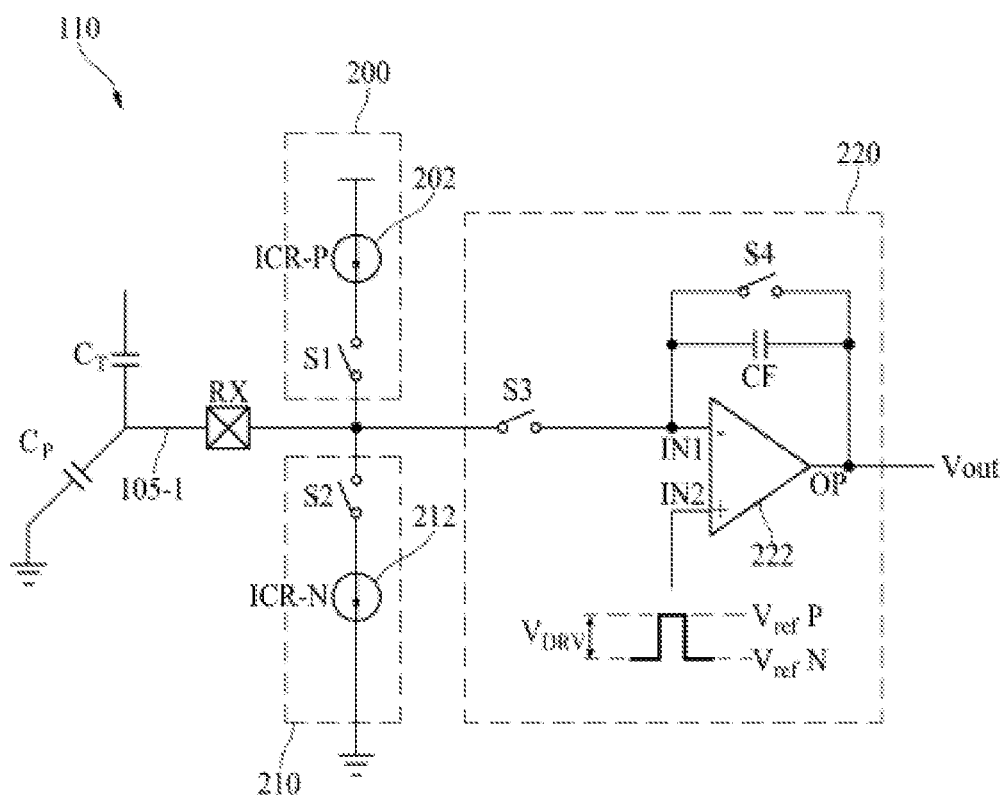
FIG. 2 is a diagram schematically illustrating a configuration of a touch sensing device according to a first embodiment of the present invention.
Figure 3:
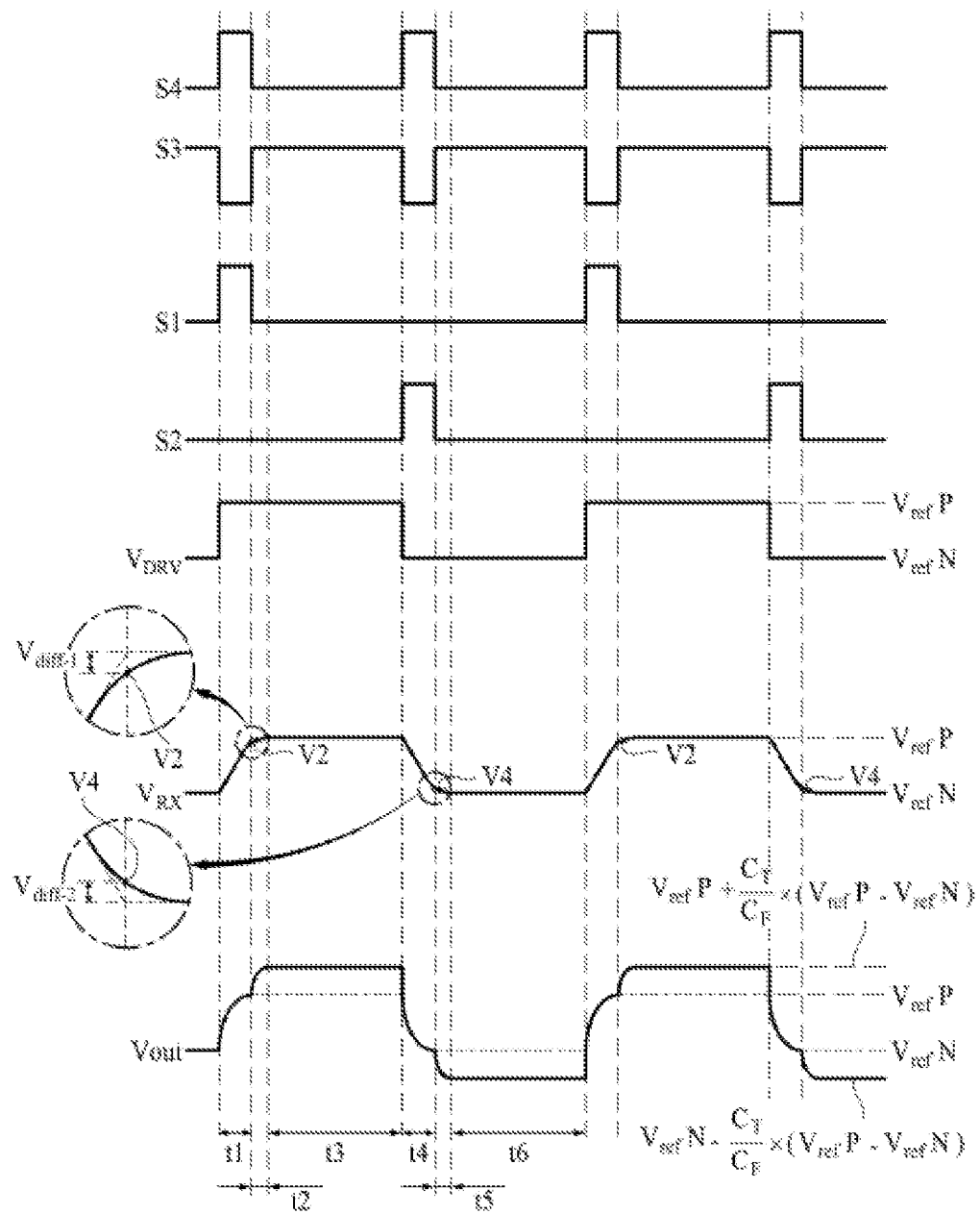
FIG. 3 is a timing diagram for driving the touch sensing device illustrated in FIG. 2.

FIG. 2 is a diagram schematically illustrating a configuration of a touch sensing device according to a first embodiment of the present invention, and FIG. 3 is a timing diagram for driving the touch sensing device illustrated in FIG. 2. As illustrated in FIG. 2, the touch sensing device 110 according to the first embodiment of the present invention may include a parasitic capacitance charger 200, a parasitic capacitance discharger 210, and a sensing unit 220. In FIG. 2, for convenience of description, the touch sensing device 110 is illustrated as including only one parasitic capacitance charger 200, one parasitic capacitance discharger 210, and one sensing unit 220, but the touch sensing device 110 according to the first embodiment of the present invention may include the parasitic capacitance charger 200, the parasitic capacitance discharger 210, and the sensing unit 220 in units of touch sensing lines 105-1 to 105-$n$.

During a predetermined charging period t1, the parasitic capacitance charger 200 may be connected to the touch sensing line 105-1 and may charge a parasitic capacitor CP of the touch electrode 107 connected to the touch sensing line 105-1 with a predetermined charging current ICR_P.

In a self-capacitance touch sensing type, a capacitor CT and the parasitic capacitor CP of the touch electrode 107 may be disposed on the same path. Therefore, the reason that the touch sensing device 110 according to the first embodiment previously charges the touch electrode 107 with the charging current during the charging period t1 prior to a first driving period t2 and a first sensing period t3 is for preventing the parasitic capacitor CP having a larger capacitance than that of the capacitor CT from being driven with the driving current when the sensing unit 220 drives the touch electrode 107 with the driving current.

That is, the touch sensing device 110 according to the first embodiment may charge the parasitic capacitor CP by using the parasitic capacitance charger 200 before touch sensing, and thus, the sensing unit 220 may drive only the capacitor CT of the touch electrode 107 without needing to drive the parasitic capacitor CP.

Therefore, an offset caused by the parasitic capacitor CP can be removed through charging the parasitic capacitor CP by the parasitic capacitance charger 200.

In an embodiment, as illustrated in FIG. 2, the parasitic capacitance charger 200 according to an embodiment of the present invention may include a current source 202 and a first switch S1.

The current source 202 may be connected to the touch sensing line 105-1 through the first switch S1 and may supply the predetermined charging current ICR_P to the parasitic capacitor CP of the touch electrode 107 through the touch sensing line 105-1.

In an embodiment, as expressed in the following Equation (1), the amount of charging current ICR_P supplied to the touch electrode 107 by the current source 202 may be determined based on the amount of electric charge which is to be charged into the parasitic capacitor CP when the parasitic capacitor CP is driven with a first voltage VrefP.

$$ICR\_P * t1 = CP * (VrefP - VrefN) \qquad \text{[Equation 1]}$$

In Equation (1), ICR_P may denote the amount of current supplied by the current source 202, t1 may denote a charging period, CP may denote a parasitic capacitance, and VrefP may denote the first voltage.

That is, the amount of charging current ICR_P may be determined as a value which allows a voltage of the parasitic capacitor CP to become the first voltage VrefP during the charging period t1 when a touch does not occur.

The first switch S1 may be turned on and may connect the current source 202 to the touch sensing line 105-1 during the charging period t1, and when the charging period t1 ends, the first switch S1 may be turned off and may disconnect the current source 202 from the touch sensing line 105-1.

During the charging period t1, the first switch S1 may be turned on, and thus, the current source 202 may supply the charging current ICR_P to the parasitic capacitor CP, whereby a voltage VRX of the parasitic capacitor CP may be charged to the first voltage VrefP as illustrated in FIG. 3. However, when a touch occurs, the charging current ICR_P may charge the capacitor CT occurring in the touch electrode 107 together, and thus, the voltage VRX of the parasitic capacitor CP may be charged to a second voltage V2 having a voltage level lower than that of the first voltage VrefP without being charged to the first voltage VrefP as illustrated in FIG. 3.

In this case, the first voltage VrefP which is the voltage VRX of the parasitic capacitor CP during the charging period t1 when a touch does not occur may be defined as expressed in the following Equation (2), and the second voltage V2 which is the voltage VRX of the parasitic capacitor CP during the charging period t1 when a touch occurs may be defined as expressed in the following Equation (3).

$$(VrefP - VrefN) = (ICR\_P * t1)/CP \qquad \text{[Equation 2]}$$

$$V2 = (ICR\_P * t1)/(CP + CT) + VrefN \qquad \text{[Equation 3]}$$

Referring again to FIG. 2, during a predetermined discharging period t4, the parasitic capacitance discharger 210 may be connected to the touch sensing line 105-1 and may discharge the parasitic capacitor CP of the touch electrode 107 connected to the touch sensing line 105-1 by using a predetermined discharging current ICR_N.

In the self-capacitance touch sensing type, the capacitor CT and the parasitic capacitor CP of the touch electrode 107 may be disposed on the same path. Therefore, the reason that the touch sensing device 110 according to the first embodiment previously discharges the touch electrode 107 by using the discharging current during the discharging period t4 prior to a second driving period t5 and a second sensing period t6 is for preventing the parasitic capacitor CP having a larger capacitance than that of the capacitor CT from being driven with the driving current when the sensing unit 220 drives the touch electrode 107 with the driving current.

That is, the touch sensing device 110 according to the first embodiment may discharge the parasitic capacitor CP by using the parasitic capacitance discharger 210 before touch sensing, and thus, the sensing unit 220 may drive only the capacitor CT of the touch electrode 107 without needing to drive the parasitic capacitor CP.

Therefore, an offset caused by the parasitic capacitor CP can be removed through discharging the parasitic capacitor CP by the parasitic capacitance discharger 210.

In an embodiment, as illustrated in FIG. 2, the parasitic capacitance discharger 210 according to an embodiment of the present invention may include a current sink 212 and a second switch S2.

The current sink 212 may be connected to the touch sensing line 105-1 through the second switch S2 and may supply the predetermined discharging current ICR_N to the parasitic capacitor CP of the touch electrode 107 through the touch sensing line 105-1 to discharge the parasitic capacitor CP.

In an embodiment, as expressed in the following Equation (4), the amount of discharging current ICR_N supplied to the touch electrode 107 by the current sink 212 may be determined based on the amount of electric charge which is to be discharged from the parasitic capacitor CP when the parasitic capacitor CP is driven with a third voltage VrefN.

$$ICR\_N * t4 = CP * VrefP - CP * VrefN \qquad \text{[Equation 4]}$$

In Equation (4), ICR_N may denote the amount of current supplied by the current sink 212, t4 may denote a discharging period, CP may denote a parasitic capacitance, and VrefN may denote the third voltage. In this case, the third voltage VrefN may be a voltage having a level which is lower than that of the first voltage VrefP. For example, when the first voltage VrefP is a voltage having a positive value, the third voltage VrefN may be a voltage having a negative value, or the first voltage VrefP may be a voltage having a positive value and the third voltage VrefN may be a ground voltage.

That is, the amount of discharging current ICR_N may be determined as a value which allows a voltage of the parasitic capacitor CP to be discharged to the third voltage VrefN during the discharging period t4 when a touch does not occur.

The second switch S2 may be turned on and may connect the current sink 212 to the touch sensing line 105-1 during the discharging period t4, and when the discharging period t4 ends, the second switch S2 may be turned off and may disconnect the current sink 212 from the touch sensing line 105-1.

During the discharging period t4, the second switch S2 may be turned on, and thus, the current sink 212 may discharge the parasitic capacitor CP by using the discharging current ICR_N, whereby the voltage VRX of the parasitic capacitor CP may be discharged to the third voltage VrefN as illustrated in FIG. 3 when a touch does not occur. However, when a touch occurs, the discharging current ICR_N may discharge the capacitor CT occurring in the touch electrode 107 together, and thus, the voltage VRX of the parasitic capacitor CP may be discharged to a fourth voltage V4 having a voltage level higher than that of the third voltage VrefN without being discharged to the third voltage VrefN as illustrated in FIG. 3.

In this case, the third voltage VrefN which is the voltage VRX of the parasitic capacitor CP during the discharging period t4 when a touch does not occur may be defined as expressed in the following Equation (5), and the fourth voltage V4 which is the voltage VRX of the parasitic capacitor CP during the discharging period t4 when a touch occurs may be defined as expressed in the following Equation (6).

$$VrefP-VrefN=(ICR\_N*t4)/CP \quad [\text{Equation 5}]$$

$$V4=(ICR\_N*t4)/(CP+CT)+VrefN \quad [\text{Equation 6}]$$

Referring again to FIG. 2, the sensing unit 220 may drive the capacitor CT of the touch electrode 107 during first and second driving periods t2 and t5, and the sensing unit 220 may sense a voltage charged into the capacitor CT according to driving of the capacitor CT during first and second sensing periods t3 and t6. The sensing unit 220 may output an output voltage, sensed during the first sensing period t3, as a first touch voltage and may output an output voltage, sensed during the second sensing period t6 as a second touch voltage.

In detail, the sensing unit 220 may be connected to the touch sensing line 105-1 during the first driving period t2 and may charge the capacitor CT of the touch electrode 107 with a first driving current ID1 corresponding to a difference voltage between the first voltage VrefP, which is the voltage VRX of the parasitic capacitor CP when a touch does not occur, and the second voltage V2 which is the voltage VRX of the parasitic capacitor CP when a touch occurs. Also, the sensing unit 220 may output the first touch voltage as an output voltage Vout which is obtained by sensing a voltage of the capacitor CT based on the first driving current ID1 during the first sensing period t3 after the first driving period t2.

Moreover, the sensing unit 220 may be connected to the touch sensing line 105-1 during the second driving period t5 and may discharge the capacitor CT of the touch electrode 107 with a second driving current ID2 corresponding to a difference voltage between the third voltage VrefN, which is the voltage VRX of the parasitic capacitor CP when a touch does not occur, and the fourth voltage V4 which is the voltage VRX of the parasitic capacitor CP when a touch occurs. Also, the sensing unit 220 may output the second touch voltage as an output voltage Vout which is obtained by sensing a voltage of the capacitor CT based on the second driving current ID2 during the second sensing period t6 after the second driving period t5.

That is, according to an embodiment of the present invention, the parasitic capacitor CP may be charged by the separate parasitic capacitance charger 200 before the first driving period t2 and the first sensing period t3, and thus, the sensing unit 220 may drive the touch electrode 107 with a just difference voltage between the first voltage VrefP, which is the voltage VRX of the parasitic capacitor CP when a touch does not occur, and the second voltage V2 which is the voltage VRX of the parasitic capacitor CP when a touch occurs, whereby the sensing unit 220 may drive only the capacitor CT of the touch electrode 107.

Also, the parasitic capacitor CP may be discharged by the separate parasitic capacitance discharger 210 before the second driving period t5 and the second sensing period t6, and thus, the sensing unit 220 may drive the touch electrode 107 with a just difference voltage between the third voltage VrefN, which is the voltage VRX of the parasitic capacitor CP when a touch does not occur, and the fourth voltage V4 which is the voltage VRX of the parasitic capacitor CP when a touch occurs, whereby the sensing unit 220 may drive only the capacitor CT of the touch electrode 107.

Therefore, an internal driving current of the sensing unit 220 may be minimized, and moreover, internal noise may be reduced and an operation of the sensing unit 220 may be stabilized, thereby obtaining a touch sensing signal having a high SNR.

To this end, as illustrated in FIG. 2, the sensing unit 220 according to an embodiment of the present invention may include an integrator 222, a third switch S3, a fourth switch S4, and a feedback capacitor CF.

The integrator 222 may include an inverting input terminal IN1, a noninverting input terminal IN2, and an output terminal OP. The inverting input terminal IN1 may be connected to the touch sensing line 105-1 and may supply the first driving current ID1 or the second driving current ID2 through the touch sensing line 105-1, and a voltage of the capacitor CT driven by the first driving current ID1 or a voltage of the capacitor CT driven by the second driving current ID2 may be input thereto.

A driving signal may be input to the noninverting input terminal IN2. In an embodiment, the driving signal may be a pulse wave where the first voltage VrefP and the third voltage VrefN alternate at a predetermined period. In this case, a level of a difference voltage between the first voltage VrefP and the third voltage VrefN may be defined as VDRV. In detail, as illustrated in FIG. 3, the third voltage VrefN may be applied to the noninverting input terminal IN2 before the charging period t1, and thus, a voltage of the touch electrode 107 may become the third voltage VrefN. Also, the first voltage VrefP may be applied to the noninverting input terminal IN2 during the charging period t1, the first driving period t2, and the first sensing period t3, and the third voltage VrefN may be applied to the noninverting input terminal IN2 during the discharging period t4, the second driving period t5, and the second sensing period t6.

The reason that the integrator 222 according to an embodiment of the present invention applies the first voltage VrefP to the noninverting input terminal IN2 during the charging period t1, the first driving period t2, and the first sensing period t3 and applies the third voltage VrefN to the noninverting input terminal IN2 during the discharging period t4, the second driving period t5, and the second sensing period t6 is for performing first-direction sensing for sensing the occurrence or not of a touch through charging of the touch electrode 107 and second-direction sensing for sensing the occurrence or not of a touch through discharging of the touch electrode 107. As described above, the integrator 222 may perform the first-direction sensing and the second-direction sensing, and thus, various filters may be applied in performing digital processing on an output voltage.

The third switch S3 may be turned off and may disconnect the integrator 222 from the touch sensing line 105-1 during the charging period t1 and the discharging period t4, and during the first and second driving periods t2 and t5 and the first and second sensing periods t3 and t6, the third switch S3 may be turned on and may connect the integrator 222 to the touch sensing line 105-1.

The fourth switch S4 may be turned on and may connect the inverting input terminal IN1 and the output terminal OP of the integrator 222 during the charging period t1 and the discharging period t4, thereby resetting the integrator 222.

In detail, when the fourth switch S4 is turned on during the charging period t1, a voltage at the inverting input terminal IN1 and a voltage at the output terminal OP of the integrator 222 may be maintained as the first voltage VrefP. When a touch does not occur during the charging period t1, as the first switch S1 is turned on, the voltage VRX of the parasitic capacitor CP may become the first voltage VrefP through charging based on the charging current ICR_P. Accordingly, when the third switch S3 is turned on and thus the inverting terminal IN1 of the integrator 222 is connected to the touch sensing line 105-1, a voltage difference may not occur between two nodes, and thus, the first voltage VrefP may be output as the first touch voltage through the output terminal OP of the integrator 222.

However, when a touch occurs during the charging period t1, the voltage VRX of the parasitic capacitor CP may be charged to the second voltage V2 which is lower than the first voltage VrefP. Thus, when the third switch S3 is turned on and the inverting terminal IN1 of the integrator 222 is connected to the touch sensing line 105-1, a first difference voltage expressed as the following Equation (7) may occur between two nodes.

$$Vdiff\_1 = [VrefN + (ICR\_P*t1)/CP] - [VrefN + (ICR\_P*t1)/(CP+CT)] \quad \text{[Equation 7]}$$

In Equation (7), Vdiff_1 may denote the first difference voltage, [VrefN+(ICR_P*t1)/CP] may denote the first voltage VrefP, and [VrefN+(ICR_P*t1)/(CP+CT)] may denote the second voltage V2.

Therefore, during the first driving period t2, the integrator 222 may drive the capacitor CT of the touch electrode 107 with the first difference voltage Vdiff_1 between the first voltage VrefP and the second voltage V2. That is, during the first driving period t2, the integrator 222 may supply the capacitor CT with the first driving current ID1 corresponding to the first difference voltage Vdiff_1 between the first voltage VrefP and the second voltage V2 to additionally charge the capacitor CT. Therefore, the integrator 222 may sense a voltage charged into the capacitor CT during the first sensing period t3 and may output the first touch voltage, obtained by adding a voltage based on driving of the first driving current ID1 to the first voltage VrefP, as an output voltage Vout as expressed in the following Equation (8).

$$\begin{aligned} Vout &= VrefP + ((CP+CT)/CF)*((ICR\_P*t1)/CP - (ICR\_P*t1)/(CP+CT)) \\ &= VrefP + CT/CF*ICR\_P*t1/CP \\ &= VrefP + CT/CF*(VrefP - VrefN) \end{aligned} \quad \text{[Equation 8]}$$

As seen in Equation (8), it may be seen that a component caused by the parasitic capacitor CP is removed from the first touch voltage which is output from the integrator 222 through sensing performed during the first sensing period t3.

As described above, during the first driving period t2 and the first sensing period t3, the integrator 222 may supply the first driving current ID1 to the touch electrode 107 to charge the touch electrode 107, and thus, may perform the first-direction sensing for outputting the first touch voltage which has increased to be higher than the first voltage VrefP.

When the fourth switch S4 is turned on during the discharging period t4, a voltage at the inverting input terminal IN1 and a voltage at the output terminal OP of the integrator 222 may be maintained as the second voltage VrefN. When a touch does not occur during the discharging period t4, as the second switch S2 is turned on, the voltage VRX of the parasitic capacitor CP may become the third voltage VrefN through discharging based on the discharging current ICR_N. Accordingly, when the third switch S3 is turned on and thus the inverting terminal IN1 of the integrator 222 is connected to the touch sensing line 105-1, a voltage difference may not occur between two nodes, and thus, as illustrated in FIG. 3, the third voltage VrefN may be output as the second touch voltage through the output terminal OP of the integrator 222.

However, when a touch occurs during the discharging period t4, as the second switch S2 is turned on, the voltage VRX of the parasitic capacitor CP may be discharged to the fourth voltage V4 which is higher than the third voltage VrefN. Thus, when the third switch S3 is turned on and the inverting terminal IN1 of the integrator 222 is connected to the touch sensing line 105-1, a second difference voltage expressed as the following Equation (9) may occur between two nodes.

$$Vdiff\_2 = [VrefP - (ICR\_N*t4)/(CP+CT)] - [VrefP - (ICR\_N*t4)/CP] \quad \text{[Equation 9]}$$

In Equation (9), Vdiff_2 may denote the second difference voltage, [VrefP−(ICR_N*t4)/CP] may denote the third voltage VrefN, and [VrefP−(ICR_N*t4)/(CP+CT)] may denote the fourth voltage V4.

Therefore, during the second driving period t5, the integrator 222 may drive the capacitor CT of the touch electrode 107 with the second difference voltage Vdiff_2 between the fourth voltage V4 and the third voltage VrefN. That is, during the second driving period t4, the integrator 222 may discharge the capacitor CT by using the second driving current ID2 corresponding to the second difference voltage Vdiff_2 between the fourth voltage V4 and the third voltage VrefN. Therefore, the integrator 222 may sense a voltage of the capacitor CT after discharging during the second sensing period t6 and may output the second touch voltage, obtained by subtracting a voltage based on driving of the second driving current ID2 from the third voltage VrefN, as an output voltage Vout as expressed in the following Equation (10).

$$\begin{aligned} Vout &= VrefN - ((CP+CT)/CF)*((ICR\_N*t4)/(CP+CT)) - (ICR\_N*t4)/CP) \\ &= VrefN - CT/CF*ICR\_N*t4/CP \\ &= VrefN - CT/CF*(VrefP - VrefN) \end{aligned} \quad \text{[Equation 10]}$$

As seen in Equation (10), it may be seen that a component caused by the parasitic capacitor CP is removed from the second touch voltage which is output from the integrator 222 through sensing performed during the second sensing period t6.

As described above, during the second driving period t5 and the second sensing period t6, the integrator 222 may discharge the touch electrode 107 by using the second driving current ID2, and thus, may perform the second-direction sensing for outputting the second touch voltage which has decreased to be lower than the third voltage VrefN.

As described above, according to an embodiment of the present invention, since the parasitic capacitor CP is previously driven by the parasitic capacitance charger 200 or the parasitic capacitance discharger 210, an offset caused by the parasitic capacitor CP may be removed and may not appear as an output of the integrator 222, thereby reducing a limitation of an output range of the integrator 222 caused by the parasitic capacitor CP.

Referring again to FIG. 2, the feedback capacitor CF may connect the inverting input terminal IN1 and the output terminal OP of the integrator 222 to control a level of the output voltage Vout.

In the touch sensing device 110 according to an embodiment of the present invention, since the parasitic capacitor CP is driven by the parasitic capacitance charger 200 or the parasitic capacitance discharger 210 before sensing the touch electrode 107, a size of the feedback capacitor CF may decrease, and thus, a design area of the touch sensing device 110 may decrease and a level of the output voltage Vout may increase.

Hereinafter, a driving method of the touch driving sensing device 110 according to an embodiment of the present invention will be described in more detail with reference to FIGS. 3 and 4. FIG. 4 is a diagram showing turn-on/off states of switches with respect to each driving timing of a touch sensing device and a flow of a current based thereon.

Figure 4A:
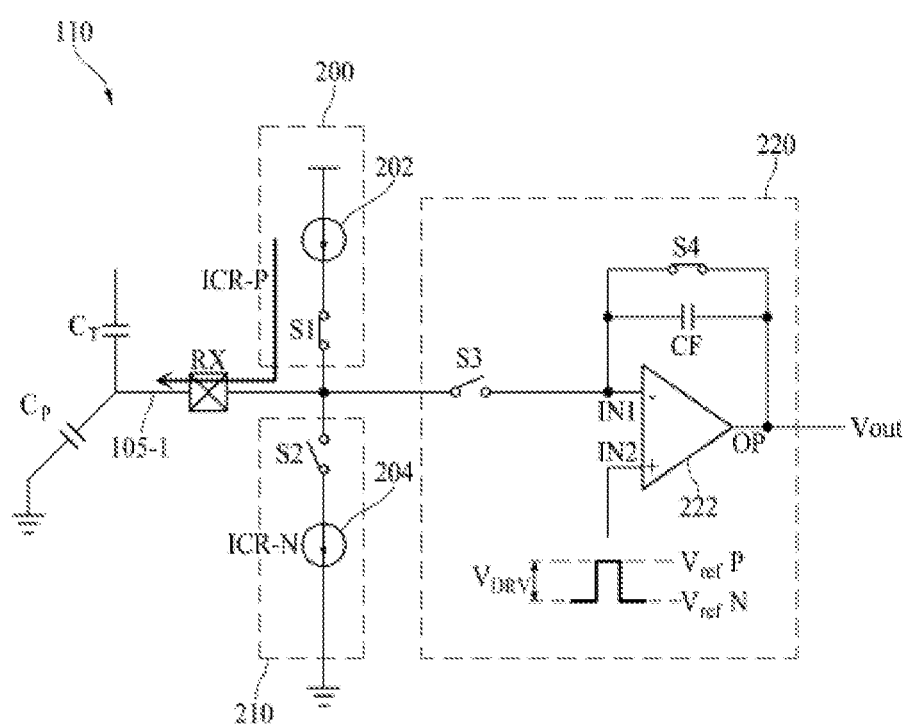
FIGS. 4A, 4B, 4C and 4D are diagrams showing turn-on/off states of switches with respect to each driving timing of a touch sensing device and a flow of a current based thereon.

As illustrated in FIG. 4A, during the charging period t1, the first and fourth switches S1 and S4 may be turned on, and the second and third switches S2 and S3 may be turned off. As the first switch S1 is turned on, the current source 202 may be connected to the touch sensing line 105-1 and may supply the charging current ICR_P to the parasitic capacitor CP to charge the parasitic capacitor CP. At this time, when a touch does not occur, the parasitic capacitor CP may be charged to the first voltage VrefP, and when a touch occurs, the parasitic capacitor CP may be charged to only the second voltage V2 lower than the first voltage VrefP due to the capacitor CT. Since the fourth switch S4 is turned on, the inverting input terminal IN1 and the output terminal OP of the integrator 222 may be connected to each other and the first voltage VrefP may be applied to the noninverting input terminal IN2, and thus, a voltage at the inverting input terminal IN1 and a voltage at the output terminal OP may be maintained as the first voltage VrefP.

Figure 4B:
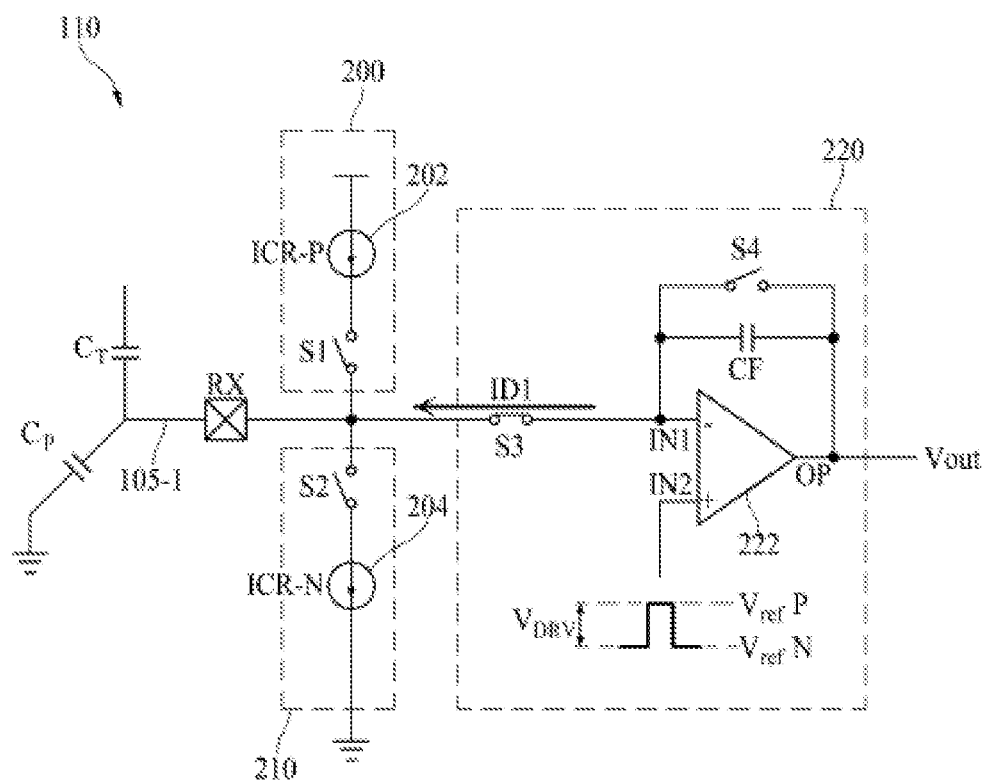

Subsequently, as shown in FIG. 4B, during the first driving period t2 and the first sensing period t3, the first switch S1, the second switch S2, and the fourth switches S4 may all be turned off, and the third switch S3 may be turned on. Therefore, the inverting input terminal INI of the integrator 222 may be connected to the touch sensing line 105-1. When a touch does not occur, a voltage at the inverting input terminal IN1 of the integrator 222 and a voltage of the parasitic capacitor CP may each be the first voltage VrefP, and thus, a voltage difference therebetween may not occur, whereby the integrator 222 may output the first voltage VrefP as the first touch voltage.

However, when a touch occurs, the inverting input terminal IN1 of the integrator 222 may be maintained as the first voltage VrefP but the parasitic capacitor CP may be charged to the second voltage V2 which is lower than the first voltage VrefP, and thus, a voltage difference equal to the first difference voltage Vdiff_1 expressed as Equation (7) may occur between two nodes. Therefore, the integrator 222 may supply the capacitor CT with the first driving current ID1 corresponding to the first difference voltage Vdiff_1, thereby driving the capacitor CT. In this manner, the integrator 222 may drive the touch electrode 107 with the first difference voltage Vdiff_1, and thus, an offset caused by the parasitic capacitor CP may be removed.

The integrator 222 may sense a voltage which is charged into the capacitor CT after charging based on the first driving current ID1 is performed, and thus, the first touch voltage expressed as Equation (8) may be output.

Figure 4C:
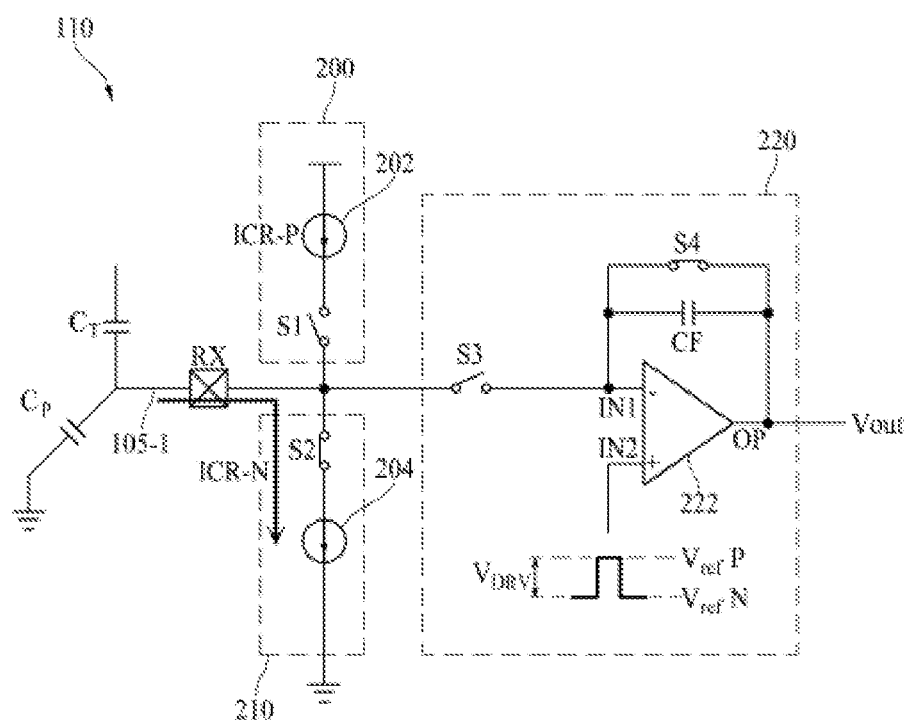

Subsequently, as shown in FIG. 4C, during the discharging period t4, the second and fourth switches S2 and S4 may be turned on, and the first and third switches S1 and S3 may be turned off. Since the second switch S2 is turned on, the current sink 212 may be connected to the touch sensing line 105-1 and may discharge the parasitic capacitor CP by using the discharging current ICR_N. At this time, when a touch does not occur, the parasitic capacitor CP may be discharged to the third voltage VrefN, but when a touch occurs, the parasitic capacitor CP may be discharged to only the fourth voltage V4 higher than the third voltage VrefN due to the capacitor CT. Also, since the fourth switch S4 is turned on, the inverting input terminal IN1 and the output terminal OP of the integrator 222 may be connected to each other, and the third voltage VrefN may be applied to noninverting input terminal IN2, whereby a voltage at the inverting input terminal IN1 and a voltage at the output terminal OP may be maintained as the third voltage VrefN.

Figure 4D:
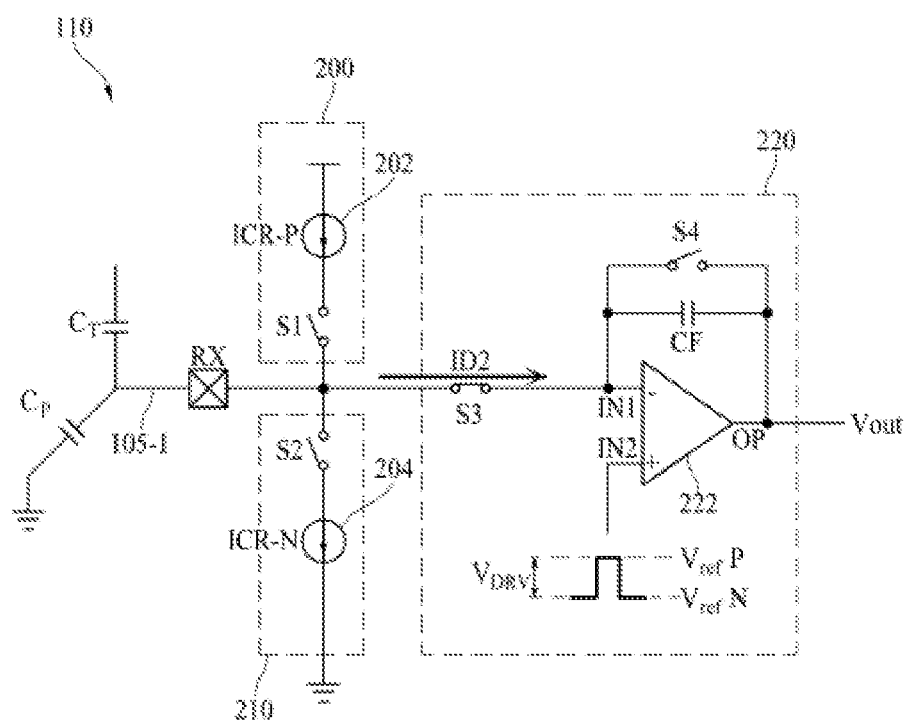

Subsequently, as shown in FIG. 4D, during the second driving period t5 and the second sensing period t6, the first switch S1, the second switch S2, and the fourth switches S4 may all be turned off, and the third switch S3 may be turned on. Therefore, the inverting input terminal IN1 of the integrator 222 may be connected to the touch sensing line 105-1. When a touch does not occur, a voltage at the inverting input terminal IN1 of the integrator 222 and a voltage of the parasitic capacitor CP may each be the third voltage VrefN, and thus, a voltage difference therebetween may not occur, whereby the integrator 222 may output the third voltage VrefN as the second touch voltage.

However, when a touch occurs, the inverting input terminal IN1 of the integrator 222 may be maintained as the third voltage VrefN but the parasitic capacitor CP may be discharged to only the fourth voltage V4 which is higher than the third voltage VrefN, and thus, a voltage difference equal to the second difference voltage Vdiff_2 expressed as Equation (9) may occur between two nodes. Therefore, the integrator 222 may additionally discharge the capacitor CT by using the second driving current ID2 corresponding to the second difference voltage Vdiff_2, thereby driving the capacitor CT. In this manner, the integrator 222 may drive the touch electrode 107 with the second difference voltage Vdiff_2, and thus, an offset caused by the parasitic capacitor CP may be removed.

The integrator 222 may sense a voltage of the capacitor CT after discharging based on the second driving current ID2 is performed, and thus, the second touch voltage expressed as Equation (10) may be output.

Figure 5:
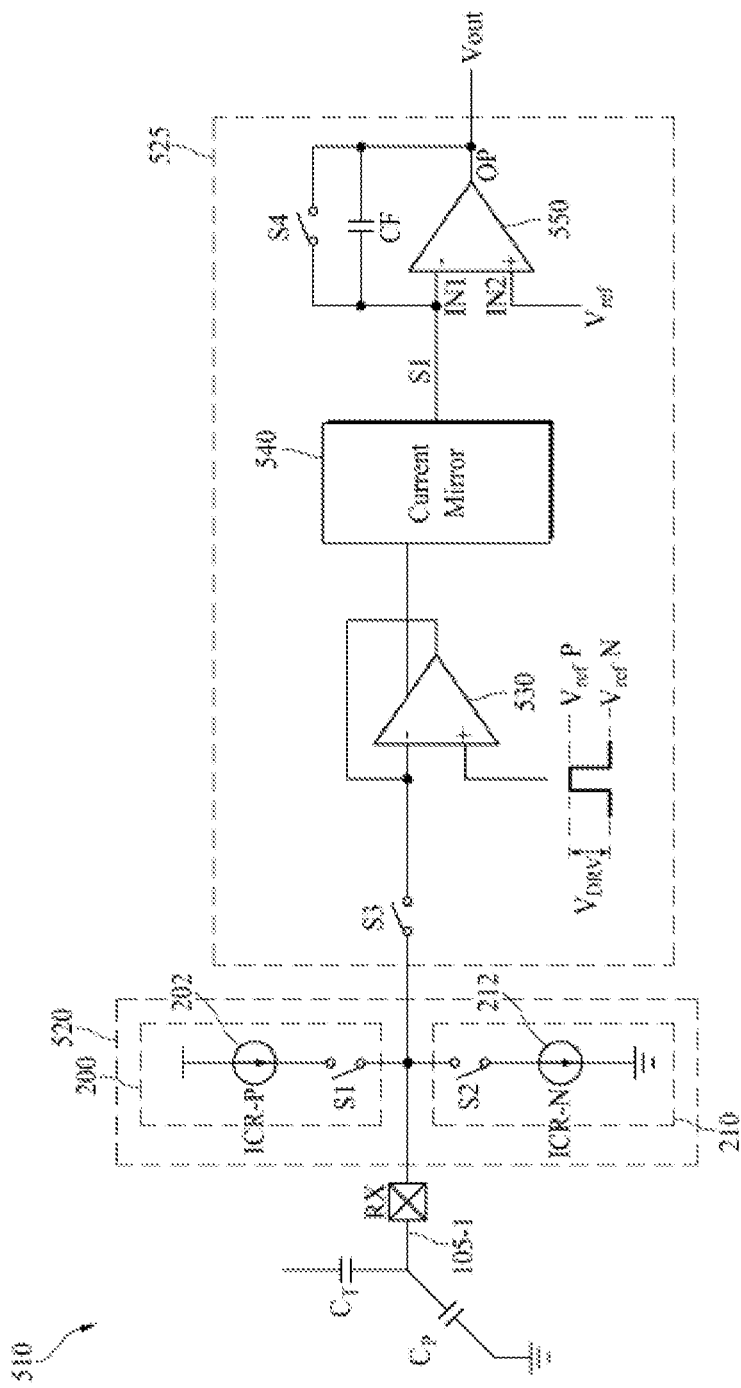
FIG. 5 is a diagram schematically illustrating a configuration of a touch sensing device according to a second embodiment of the present invention.

In the above-described embodiment, the sensing unit 220 has been described as including the integrator 222, the third switch S3, the fourth switch S4, and the feedback capacitor CF. However, as illustrated in FIG. 5, a sensing unit of a touch sensing device according to a second embodiment of the present invention may further include a buffer and a current mirror unit. Hereinafter, the touch sensing device according to the second embodiment of the present invention will be described in more detail with reference to FIG. 5.

FIG. 5 is a diagram schematically illustrating a configuration of a touch sensing device 510 according to a second embodiment of the present invention. As illustrated in FIG. 5, the touch sensing device 510 according to the second embodiment of the present invention may include an electric charge controller 520 and a sensing unit 525. In FIG. 5, the touch sensing device 510 according to the second embodiment is illustrated as including one electric charge controller 520 and one sensing unit 525, but is not limited thereto and may include the electric charge controller 520 and the sensing unit 525 in units of touch sensing lines 105-1 to 105-n.

The electric charge controller 520 may be connected to the touch sensing line 105-1, and before touch sensing, the electric charge controller 520 may charge a parasitic capacitor CP of a touch electrode 107 connected to the touch sensing line 105-1 with a predetermined charging current or may discharge the parasitic capacitor CP by using a predetermined discharging current, thereby controlling the amount of electric charge of the parasitic capacitor CP.

To this end, the electric charge controller 520 may include a parasitic capacitance charger 200 for charging the parasitic capacitor CP and a parasitic capacitance discharger 210 for discharging the parasitic capacitor CP.

The parasitic capacitance charger 200 may be connected to the touch sensing line 105-1 and may charge the parasitic capacitor CP of the touch electrode 107 connected to the touch sensing line 105-1 with a predetermined charging current ICR_P during a predetermined charging period.

The parasitic capacitance discharger 210 may be connected to the touch sensing line 105-1 and may discharge the parasitic capacitor CP of the touch electrode 107 connected to the touch sensing line 105-1 by using a predetermined discharging current ICR_N during a predetermined discharging period.

A function of each of the parasitic capacitance charger 200 and the parasitic capacitance discharger 210 is the same as the illustration of FIG. 2, and thus, its detailed description is omitted.

The sensing unit 525 may drive a capacitor CT of the touch electrode 107 during a driving period, and during a sensing period, the sensing unit 525 may sense a voltage charged into the capacitor CT according to driving of the capacitor CT and may output the sensed voltage. To this end, as illustrated in FIG. 5, the sensing unit 525 may include a buffer 530, a current mirror unit 540, a third switch S3, a third switch S4, and a feedback capacitor CF.

The buffer 530, as the third switch S3 is turned on, may be connected to the touch sensing line 105-1 and may drive the capacitor CT of the touch electrode 107 with a first driving current ID1 during a first driving period t2 and a first sensing period t3. The first driving current ID1 is corresponding to a first difference voltage Vdiff_1 between a first voltage VrefP of the parasitic capacitor CP based on charging of the parasitic capacitance charger 200 when a touch does not occur and a second voltage V2 of the parasitic capacitor CP based on charging of the parasitic capacitance charger 200 when a touch occurs. The buffer 530 outputs a first touch voltage of the capacitor CT based on the first driving current ID1 as a first current and a second current.

Also, the buffer 530, as the third switch S3 is turned on, may be connected to the touch sensing line 105-1 and may drive the capacitor CT of the touch electrode 107 with a second driving current ID2 during a second driving period t5 and a second sensing period t6. The a second driving current ID2 is corresponding to a second difference voltage Vdiff_2 between a third voltage VrefN of the parasitic capacitor CP based on discharging of the parasitic capacitance discharger 210 when a touch does not occur and a fourth voltage V4 of the parasitic capacitor CP based on discharging of the parasitic capacitance discharger 210 when a touch occurs. The buffer outputs a second touch voltage of the capacitor CT based on the second driving current ID2 as a first current and a second current.

An operation of generating, by the buffer 530 according to the present embodiment, the first and second touch voltages is the same as an operation of generating, by the integrator 222 illustrated in FIG. 2, the first and second touch voltages. Thus, a detailed description for generating the first and second touch voltages is omitted. Also, an operation of generating, by the buffer 530, the first and second currents from the first and second touch voltages will be described below along with an operation of the current mirror unit 540.

In an embodiment, the buffer 530 may be implemented as an operational amplifier having a voltage gain of 1. In this case, the buffers 530, connected to the corresponding touch sensing line of the plurality of touch sensing lines 105-1 to 105-n, of a first stage may be a unit gain buffer, a unit gain amplifier, or a buffer amplifier.

According to an embodiment of the present invention, the touch sensing lines 105-1 to 105-n are respectively and directly connected to the buffers 530, and thus, an additional circuit (for example, a multiplexer (MUX)) may not be needed between each of the buffers 120-1 to 120-n and a corresponding touch sensing line of the touch sensing lines 105-1 to 105-n.

Moreover, according to an embodiment of the present invention, since the touch sensing lines 105-1 to 105-n are respectively and directly connected to the buffers 530, signals may be simultaneously generated in all transmission channels. Here, each of the transmission channels may denote a circuit which includes an electric charge controller, buffer, a current mirror unit, and an integrator.

Therefore, comparing with a conventional time sequence manner where a touch sensing device sequentially senses transmission channels, a sensing time of the touch sensing device 510 may not increase or may be considerably shortened, and moreover, the degradation in signal quality caused by a time sequence-based sensing time difference may not occur or may be considerably reduced.

Moreover, a first stage of each transmission channel may be configured with a plurality of buffers 530, thereby solving a problem where it is difficult to design an amplifier due to a limitation of a feedback factor caused by a high capacitance load (for example, difficulty caused by an amplification speed and current consumption) and a design area increases due to the use of a large feedback capacitor.

The current mirror unit 540 may perform current mirroring on a first current provided from the buffer 530 to generate a first mirror current. The current mirror unit 540 may perform current mirroring on a second current provided from the buffer 530 to generate a second mirror current. The current mirror unit 540 generates an output signal S1 using the first mirror current and the second mirror current. In an embodiment, the current mirror unit 540 may be a charge-to-current converter which converts an input electric charge into an output current.

In this case, the amounts of the first and second mirror currents may be the same, the amounts of the first and second mirror current may be adjusted by using control signals.

The integrator 550 integrates a difference between the predetermined reference signal REF and the output signal S1 of the current mirror unit 540. Accordingly, an integral signal corresponding to a difference between the reference signal REF and the output signal S1 of the current mirror unit 540 may be output from the integrator 550.

Figure 6:
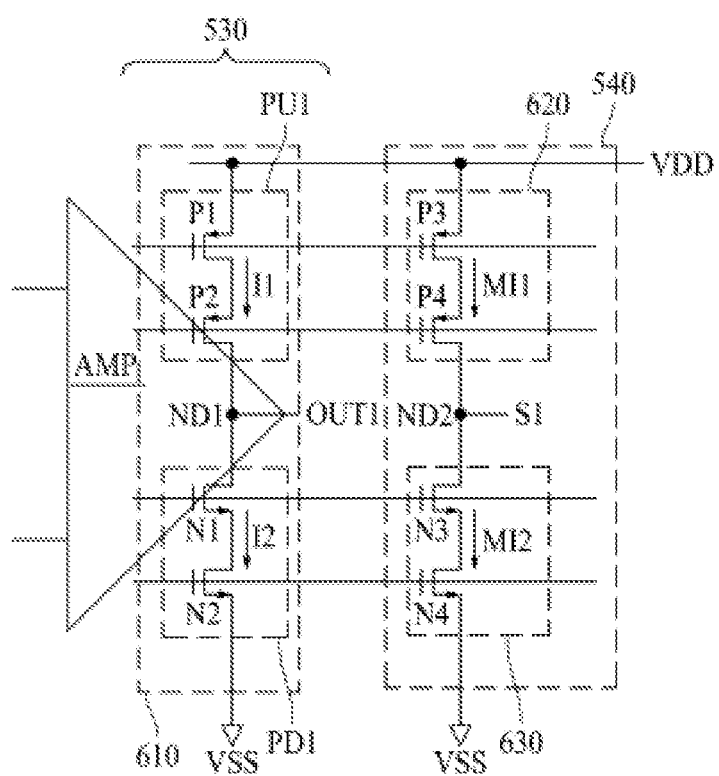
FIG. 6 is a circuit diagram illustrating a buffer and a current mirror unit each illustrated in FIG. 5.

Hereinafter, an operation of the touch sensing device 510 illustrated in FIG. 5 will be described in detail with reference rated in FIG. 6. FIG. 6 is a circuit diagram for describing a configuration of the buffer and the current mirror unit each illustrated in FIG. 5. In FIG. 6, for convenience of description, an operation of the buffer 530, the current mirror unit 540, and the integrator 550 in the touch sensing device 510 illustrated in FIG. 5 will be mainly described.

As described in FIG. 6, the buffer 530 may include an operational amplifier AMP and an output circuit 610, and in order to configure a unit gain buffer, an output terminal ND1 of the operational amplifier AMP may be connected to an input terminal, connected to the touch sensing line 105-1, of the operational amplifier AMP.

The output circuit 610 may include a pull-up circuit PU1 and a pull-down circuit PD1. Each of the pull-up circuit PU1 and the pull-down circuit PD1 may be implemented as a cascode configuration.

The pull-up circuit PU1 may include a plurality of PMOS transistors P1 and P2 serially connected between the output terminal ND1 and a first power line (or a power node) through which a first power VDD is provided, and in a pull-up operation (or a current sourcing operation), a first current I1 may flow to the output terminal ND1 through the pull-up circuit PU1.

The pull-down circuit PD1 may include a plurality of NMOS transistors N1 and N2 serially connected between the output terminal ND1 and a second power line through which a second power VSS is provided, and in a pull-down operation (or a current sinking operation), a second current I2 may flow to the second power line through the pull-down circuit PD1.

The current mirror unit 540 may include a first mirror current generating circuit 620 and the second mirror current generating circuit 630 as illustrated in FIG. 6.

The first mirror current generating circuit 620 and the pull-up circuit PU1 configure a current mirror, and the first mirror current generating circuit 620 perform a mirroring operation on the first current I1 to generate the first mirror current MI1. In embodiment, the first mirror current generating circuit 620 may be implemented as a PMOS cascode current mirror circuit. According to the this embodiment, the first mirror current generating circuit 620 may include a plurality of PMOS transistors P3 and P4 serially connected between a first mirror output terminal ND2 and the first power line through which the first power VDD is provided, and in a pull-up operation (or a current sourcing operation), the first mirror current MI1 may flow to the second output terminal ND2 through the first mirror current generating circuit 620.

The amount of the first current I1 may be higher than the amount of the first mirror current MI1. For example, when it is assumed that lengths of channels of the PMOS transistors P1 to P4 are the same, widths of the channels of the PMOS transistors P1 and P2 are the same, and the width of the channel of the PMOS transistor P1 is K (where K is an integer of 2 or more) times the width of the channel of the PMOS transistor P3, the amount of the first mirror current MI1 may be 1/K times the amount of the first current I1.

Under such an assumption, when widths of the channels of the PMOS transistors P3 and P4 are capable of being adjusted by using control signals, the amount of the first mirror current MI1 may be adjusted.

The second mirror current generating circuit 630 and pull-down circuit PD1 may configure a current mirror, and the second mirror current generating circuit 630 perform a mirroring operation on the second current I2 to generate the second mirror current MI2. In embodiment, the second mirror current generating circuit 630 may be implemented as a NMOS cascode current mirror circuit. According to the this embodiment, the second mirror current generating circuit 630 may include a plurality of NMOS transistors N3 and N4 serially connected between the second output terminal ND2 and the second power line through which the second power VSS is provided, and in a pull-down operation (or a current sinking operation), the second mirror current MI2 may flow to the second power line through the second mirror current generating circuit 630. Accordingly, the output signal S1 corresponding to a difference between the first mirror current MI1 and the second mirror current MI2 may be output through the second output terminal ND2.

The amount of the second current I2 may be higher than the amount of the second mirror current MI2. For example, when it is assumed that lengths of channels of the NMOS transistors N1 to N4 are the same, widths of the channels of the NMOS transistors N1 and N2 are the same, and the width of the channel of the NMOS transistor N1 is K (where K is an integer of 2 or more) times the width of the channel of the NMOS transistor N3, the amount of the second mirror current MI2 may be 1/K times the amount of the second current I2.

Under such an assumption, when widths of the channels of the NMOS transistors N3 and N4 are capable of being adjusted by using control signals, the amount of the second mirror current MI2 may be adjusted.

According to the above embodiment, the output signal S1 provided through the second output node ND2 is input to the integrator 550 and thus, the integrator 550 integrates a difference between the reference signal REF and the output signal S1.

As described above, since each of the output circuit 610, the first mirror current generating circuit 620, and the second mirror current generating circuit 630 are implemented as a cascode current mirror, a direct current (DC) current mismatch of MOS transistors configuring each of the first and second mirror current generating circuit 620 and 630 may be minimized, and thus, a DC current accumulated into the integrator 550 may be minimized. Accordingly, an output range of the integrator 550 may be efficiently used, distortion of differential signals may be removed or considerably reduced, and a function of removing common noise caused by a mismatch with adjacent transmission channels may be enhanced.

In the above embodiments, it is described that the integrator 550 integrates a difference between the output signal S1 of the current mirror unit 540 and the reference signal REF. However, in another embodiment of the present invention, the integrator 550 integrates a difference between the output signals provided from the current mirror units of adjacent channels. Hereinafter, a touch sensing device according to the third embodiment of the present invention will be described with reference to FIGS. 7 and 8.

Figure 7:
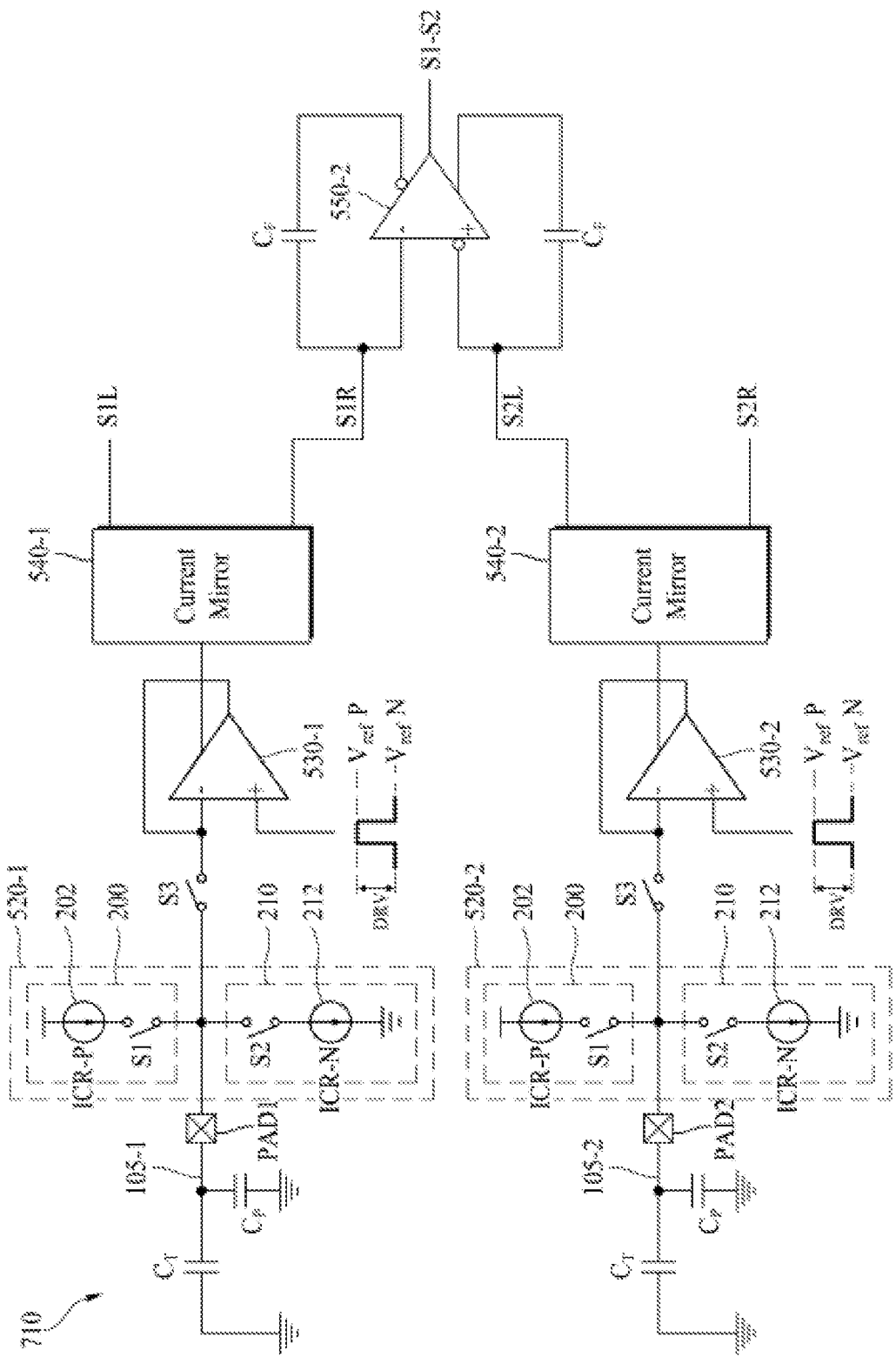
FIG. 7 is a diagram schematically illustrating a configuration of a touch sensing device according to a third embodiment of the present invention.
Figure 8:
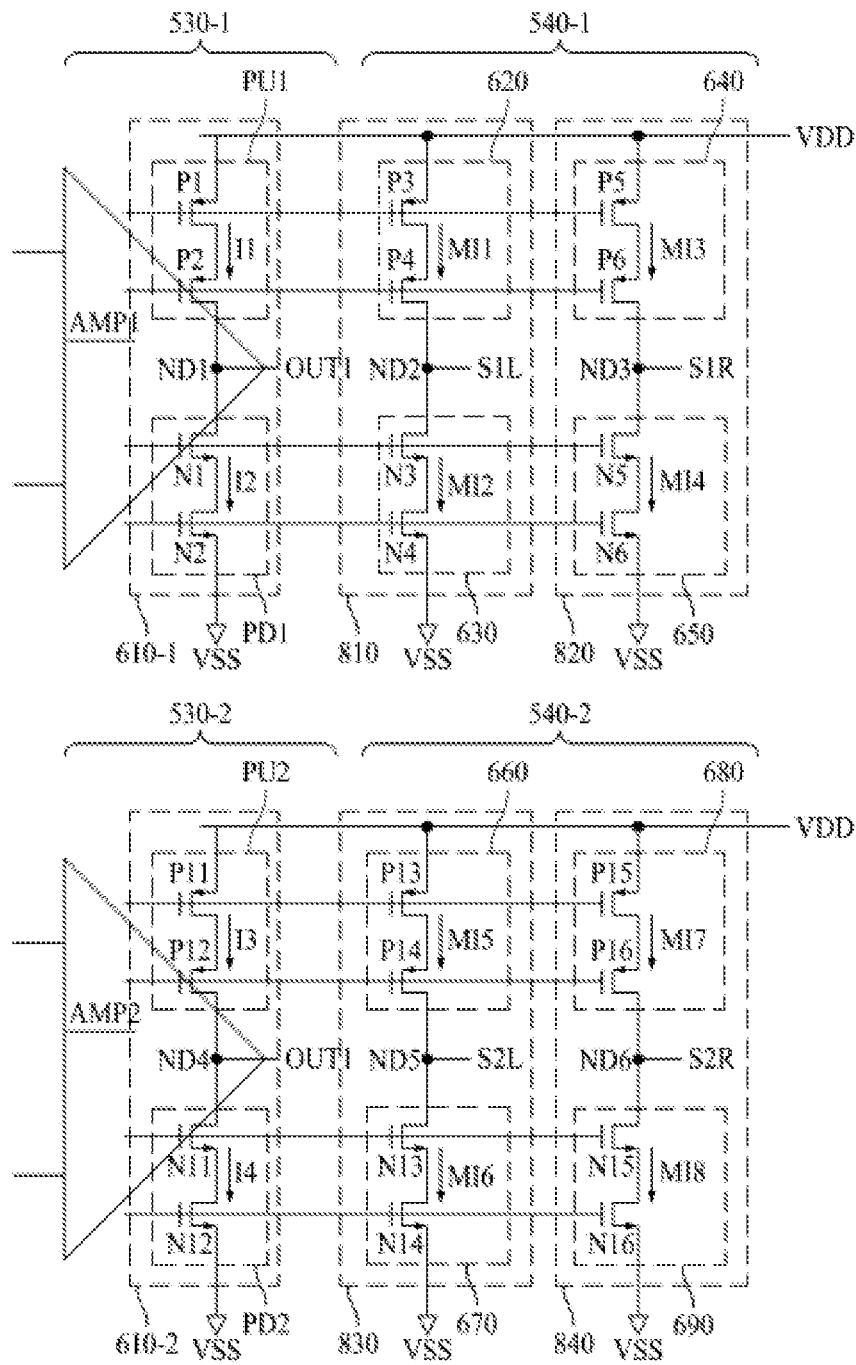
FIG. 8 is a circuit diagram illustrating a buffer and a current mirror unit each illustrated in FIG. 7.

FIG. 7 is a diagram schematically illustrating a configuration of a touch sensing device according to a third embodiment of the present invention. FIG. 8 is a circuit diagram illustrating a buffer and a current mirror unit each illustrated in FIG. 7.

As illustrated in FIG. 7, the basic configuration of the touch sensing device 710 according to third embodiment of the present invention is similar to the configuration of the touch sensing device 510, illustrated in FIG. 5, according to second embodiment of the present invention.

However, as illustrated in FIG. 7, comparing the touch sensing device according to third embodiment with the touch sensing device illustrated in FIG. 5, it is different that the second integrator 550 integrates a difference between a output signal provided from a first current mirror unit 540-1 connected to a first touch sensing line 105-1 and a output signal provided from a second current mirror unit 540-2 connected to a second touch sensing line 105-2, the first current mirror unit 540-1 generates two output signals S1R and S1L, and the second current mirror unit 540-2 generates two output signals S2R and S2L.

Thus, hereinafter, it will be mainly described about the above mentioned differences with reference to FIGS. 7 and 8.

As illustrated in FIG. 8, the first buffer 530-1 may include a first operational amplifier AMP1 and a first output circuit 610-1, and in order to configure a unit gain buffer, a first output terminal ND1 of the first operational amplifier AMP1 may be connected to an input terminal, connected to the first touch sensing line 105-1, of the first operational amplifier AMP1.

The first output circuit 610-1 may include a first pull-up circuit PU1 and a first pull-down circuit PD1. Each of the first pull-up circuit PU1 and the first pull-down circuit PD1 may be implemented as a cascode configuration.

The first pull-up circuit PU1 may include a plurality of PMOS transistors P1 and P2 serially connected between the first output terminal ND1 and a first power line (or a power node) through which a first power VDD is provided, and in a pull-up operation (or a current sourcing operation), a first current I1 may flow to the first output terminal ND1 through the first pull-up circuit PU1.

The first pull-down circuit PD1 may include a plurality of NMOS transistors N1 and N2 serially connected between the first output terminal ND1 and a second power line through which a second power VSS is provided, and in a pull-down operation (or a current sinking operation), a second current I2 may flow to the second power line through the first pull-down circuit PD1.

The first current mirror unit 540-1 may include a first current mirror circuit 810 and a second current mirror circuit 820 as illustrated in FIG. 8. The first current mirror circuit 810 includes a first mirror current generating circuit 620 and a second mirror current generating circuit 630, the second current mirror circuit 820 includes a third mirror current generating circuit 640 and a fourth mirror current generating circuit 650.

Comparing the first and second mirror current generating circuit 620 and 630 illustrated in FIG. 8 with the first and the second mirror current generating circuit 620 and 630 illustrated in FIG. 6, it is just different that the first and second mirror current generating circuit 620 and 630 output a first output signal S1L corresponding to a difference between a first mirror current MI1 and a second mirror current MI2 and the other basic operation of the first and second mirror current generating circuit 630 is similar to each other, and thus, the detailed description will be omitted.

The third mirror current generating circuit 640 and the first pull-up circuit PU1 configure a current mirror, and the third mirror current generating circuit 640 perform a mirroring operation on the first current I1 to generate the third mirror current MI3. In embodiment, the third mirror current generating circuit 640 may be implemented as a PMOS cascode current mirror circuit. According to the this embodiment, the third mirror current generating circuit 640 may include a plurality of PMOS transistors P5 and P6 serially connected between a third output terminal ND3 and the first power line through which the first power VDD is provided, and in a pull-up operation (or a current sourcing operation), the third mirror current MI3 may flow to the third output terminal ND3 through the third mirror current generating circuit 640.

The amount of the first current I1 may be higher than the amount of the third mirror current MI3. For example, when it is assumed that lengths of channels of the PMOS transistors P1, P2, P5, and P6 are the same, widths of the channels of the PMOS transistors P5 and P6 are the same, and the width of the channel of the PMOS transistor P1 is K (where K is an integer of 2 or more) times the width of the channel of the PMOS transistor P5, the amount of the third mirror current MI3 may be 1/K times the amount of the first current I1.

Under such an assumption, when widths of the channels of the PMOS transistors P5 and P6 are capable of being adjusted by using control signals, the amount of the third mirror current MI3 may be adjusted.

The fourth mirror current generating circuit 650 and the first pull-down circuit PD1 may configure a current mirror, and the fourth mirror current generating circuit 650 perform a mirroring operation on the second current I2 to generate the fourth mirror current MI4. In embodiment, the fourth mirror current generating circuit 650 may be implemented as a NMOS cascode current mirror circuit. According to the this embodiment, the fourth mirror current generating circuit 650 may include a plurality of NMOS transistors N5 and N6 serially connected between the third output terminal ND3 and the second power line through which the second power VSS is provided, and in a pull-down operation (or a current sinking operation), the fourth mirror current MI4 may flow to the second power line through the fourth mirror current generating circuit 650. Accordingly, the second output signal S1R corresponding to a difference between the third mirror current MI3 and the fourth mirror current MI4 may be output through the third output terminal ND3.

The amount of the second current I2 may be higher than the amount of the fourth mirror current MI4. For example, when it is assumed that lengths of channels of the NMOS transistors N1, N2, N5, and N6 are the same, widths of the channels of the NMOS transistors N5 and N6 are the same, and the width of the channel of the NMOS transistor N1 is K (where K is an integer of 2 or more) times the width of the channel of the NMOS transistor N5, the amount of the fourth mirror current MI4 may be 1/K times the amount of the second current I2.

Under such an assumption, when widths of the channels of the NMOS transistors N5 and N6 are capable of being adjusted by using control signals, the amount of the fourth mirror current MI4 may be adjusted.

The second buffer 530-2 may include a second operational amplifier AMP2 and a second output circuit 610-2, and in order to configure a unit gain buffer, a fourth output terminal ND4 of the second operational amplifier AMP2 may be connected to an input terminal, connected to the second touch sensing line 105-2, of the second operational amplifier AMP2.

The second output circuit 610-2 may include a second pull-up circuit PU2 and a second pull-down circuit PD2.

Each of the second pull-up circuit PU2 and the second pull-down circuit PD2 may be implemented as a cascode configuration.

The second pull-up circuit PU2 may include a plurality of PMOS transistors P11 and P12 serially connected between the fourth output terminal ND4 and a first power line (or a power node) through which a first power VDD is provided, and in a pull-up operation (or a current sourcing operation), a third current I3 may flow to the fourth output terminal ND4 through the second pull-up circuit PU2.

The second pull-down circuit PD2 may include a plurality of NMOS transistors N11 and N12 serially connected between the fourth output terminal ND4 and a second power line through which a second power VSS is provided, and in a pull-down operation (or a current sinking operation), a fourth current I4 may flow to the second power line through the second pull-down circuit PD2.

The second current mirror unit 540-2 may include a third current mirror circuit 830 and a fourth current mirror circuit 840 as illustrated in FIG. 8. The third current mirror circuit 830 includes a fifth mirror current generating circuit 660 and a sixth mirror current generating circuit 670, the fourth current mirror circuit 840 includes a seventh mirror current generating circuit 680 and a eighth mirror current generating circuit 690.

Comparing the fifth and sixth mirror current generating circuit 660 and 670 illustrated in FIG. 8 with the first and the second mirror current generating circuit 620 and 630 illustrated in FIG. 8, it is just different that the fifth and sixth mirror current generating circuit 660 and 670 output a third output signal S2L corresponding to a difference between a fifth mirror current MI5 and a sixth mirror current MI6 through the fifth output terminal ND5 and the other basic operation of the fifth and sixth mirror current generating circuit 660 and 670 is similar to the first and second mirror current generating circuit 620 and 630, and thus, the detailed description will be omitted.

Comparing the seventh and eighth mirror current generating circuit 680 and 690 illustrated in FIG. 8 with the third and the fourth mirror current generating circuit 640 and 650 illustrated in FIG. 8, it is just different that the seventh and eighth mirror current generating circuit 680 and 690 output a fourth output signal S2R corresponding to a difference between a seventh mirror current MI7 and a eighth mirror current MI8 through the six output terminal ND6 and the other basic operation of the seventh and eighth mirror current generating circuit 680 and 690 is similar to the fifth and sixth mirror current generating circuit 640 and 650, and thus, the detailed description will be omitted.

According to the above embodiment, the second output signal S1L provided through the second output node ND2 is input to one terminal of the second integrator 550-2 and the third output signal S2R provided through the sixth output node ND6 is input to another terminal of the second integrator 550-2, and thus, the second integrator 550-2 integrates a difference between the first output signal S1L and the fourth output signal S2R.

According to the above embodiments, since a differential operation is perform on outputs from the current mirror units of adjacent channels, display noise and external noise occurring in common may be effectively removed.

In addition, the reference signal REF for single-ended conversion may be selectively used in a first transmission channel and a last transmission channel, and thus, algorithm processing may be easily performed on the output signals. For example, the algorithm may determine a transmission channel, where noise or a touch does not occur, between the first transmission channel and the last transmission channel and may selectively convert differential signals obtained on the determined transmission channel into a single-ended signal.

Those skilled in the art may understand that the above-described embodiments of the present invention are implemented in other detailed forms without changing the technical spirit or essential feature of the present invention.

For example, in the above-described embodiments, the display apparatus has been described as including a plastic OLED, but the present invention is not limited thereto and may be applied to a display apparatus including a display panel such as a liquid crystal display panel.

Moreover, a touch sensing device according to the present invention may be implemented as an integrated circuit (IC) type, and a function of the touch sensing device may be implemented as a program type and may be equipped in an IC. When the function of the touch sensing device according to the present invention is implemented as a program, a function of each element included in the touch sensing device may be implemented as a specific code, and codes for implementing a specific function may be implemented as one program or may be implemented to be divided into a plurality of programs.

According to the embodiments of the present invention, since an offset caused by a parasitic capacitor is removed by driving the parasitic capacitor with a separate electric charge controller before sensing a touch electrode, the offset caused by the parasitic capacitor may not appear as an output of a sensing amplifier, thereby reducing a limitation of an output range of the sensing amplifier caused by the parasitic capacitor.

Moreover, according to the embodiments of the present invention, since the parasitic capacitor is driven by the separate electric charge controller and the sensing amplifier drives only a capacitor of the touch electrode, an internal driving current of the sensing amplifier may be minimized, and thus, internal noise may be reduced and an operation of the sensing amplifier may be stabilized, thereby obtaining a touch sensing signal having a high SNR.

Moreover, according to the embodiments of the present invention, since the parasitic capacitor is driven by the separate electric charge controller before sensing the touch electrode, a size of a feedback capacitor may decrease, and thus, a design area of the sensing amplifier may decrease and a level of an output voltage may increase.

Moreover, according to the embodiments of the present invention, the sensing amplifier may perform sensing in a first direction to output a positive output voltage and may perform sensing in a second direction to output a negative output voltage, and thus, various filters may be applied in performing digital processing on an output voltage.

Moreover, according to the embodiments of the present invention, the touch electrode may be driven at a high driving frequency, and thus, a large amount of data may be obtained compared to a unit time.

Moreover, according to the embodiments of the present invention, since a first stage is configured with a buffer and a current mirror unit and a second stage is configured with a sensing amplifier for differentially sensing outputs of current mirror units of adjacent channels, display noise and external noise occurring in common may be effectively removed.

Moreover, according to the embodiments of the present invention, since the buffers implemented in the touch sensing device are respectively connected to the touch sensing lines of the touch screen panel, an additional circuit (for example, a multiplexer) may not be needed between each of the buffers and a corresponding touch sensing line of the touch driving lines.

Moreover, according to the embodiments of the present invention, since the buffers implemented in the touch sensing device are respectively connected to the touch sensing lines of the touch screen panel, signals may be simultaneously generated or processed in all channels. Accordingly, comparing with a conventional time sequence manner where a touch sensing device sequentially senses signals of channels, an increase in a sensing time may be reduced, and the degradation in signal quality caused by a time sequence-based sensing time difference may be reduced.

Moreover, according to the embodiments of the present invention, since the first stage is configured with buffers, a limitation of a feedback factor based on a high capacitance load may be reduced, and thus, it may be easy to design a sensing amplifier and it may not be required to increase a feedback capacitor, thereby minimizing an increase in a design area and a reduction in an output signal of the sensing amplifier.

Moreover, according to the embodiments of the present invention, a gain of an output signal in the second stage may be adjusted by using a current mirror unit included in the first stage, and thus, a value of a feedback capacitor of a sensing amplifier included in the second stage may be reduced, thereby maximizing the design area efficiency of the sensing amplifier.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

What is claimed is:

1. A touch sensing device of a current driving type, the touch sensing device comprising:
    a parasitic capacitance charger connected to a touch sensing line to charge a parasitic capacitor of a touch electrode connected to the touch sensing line with a predetermined charging current during a charging period; and
    a sensing unit connected to the touch sensing line during a first driving period to drive a capacitor of the touch electrode with a first driving current corresponding to a difference voltage between a first voltage, charged into the parasitic capacitor when a touch does not occur, and a second voltage charged into the parasitic capacitor when a touch occurs and to sense a first touch voltage of the capacitor based on the first driving current during a first sensing period,
    wherein the sensing unit applies a driving signal to the touch electrode through the touch sensing line prior to the charging period to allow a voltage of the touch electrode to become a third voltage having a level lower than a level of the first voltage.

2. The touch sensing device of claim 1, wherein the parasitic capacitance charger comprises:
    a current source supplying the charging current to the parasitic capacitor to charge the parasitic capacitor during the charging period; and
    a first switch turned on to connect the current source to the touch sensing line during the charging period, and when the charging period ends, turned off to disconnect the current source from the touch sensing line.

3. The touch sensing device of claim 1, wherein an amount of the charging current is determined as a value allowing a voltage of the parasitic capacitor to become the first voltage during the charging period.

4. The touch sensing device of claim 1, further comprising a parasitic capacitance discharger connected to the touch sensing line to discharge the parasitic capacitor by using a predetermined discharging current during a discharging period after the first sensing period,
    wherein, during a second driving period, the sensing unit is connected to the touch sensing line and drives the capacitor with a second driving current corresponding to a difference voltage between a third voltage of the parasitic capacitor based on the discharging when a touch does not occur and a fourth voltage of the parasitic capacitor based on the discharging when a touch occurs, and during a second sensing period, the sensing unit senses a second touch voltage of the capacitor based on the second driving current.

5. The touch sensing device of claim 4, wherein the parasitic capacitance discharger comprises:
    a current sink discharging the parasitic capacitor by using the discharging current during the discharging period; and
    a second switch turned on to connect the current sink to the touch sensing line during the discharging period, and when the discharging period ends, turned off to disconnect the current sink from the touch sensing line.

6. The touch sensing device of claim 4, wherein an amount of the discharging current is determined as a value allowing a voltage of the parasitic capacitor to become the third voltage having a level lower than a level of the first voltage during the discharging period.

7. The touch sensing device of claim 4, wherein the sensing unit comprises:
    an integrator including an inverting input terminal connected to the touch sensing line, a noninverting input terminal driven with the first voltage or the third voltage, and an output terminal through which the first touch voltage or the second touch voltage is output; and
    a third switch turned off to disconnect the integrator from the touch sensing line during the charging period and the discharging period, and during the first and second driving periods and the first and second sensing periods, turned on to connect the integrator to the touch sensing line.

8. The touch sensing device of claim 7, wherein the sensing unit further comprises:
    a fourth switch turned on to connect the inverting input terminal to the output terminal to maintain a voltage at each of the output terminal and the inverting input terminal as the first voltage or the third voltage during the charging period and the discharging period, and when the charging period and the discharging period end, turned off to disconnect the inverting input terminal from the output terminal; and
    a feedback capacitor connected between the inverting input terminal and the output terminal.

9. A touch sensing device of a current driving type, the touch sensing device comprising:
    an electric charge controller connected to a touch sensing line to charge a parasitic capacitor of a touch electrode connected to the touch sensing line with a predetermined charging current or discharge the parasitic capacitor by using a predetermined discharging current to control an amount of an electric charge of the parasitic capacitor;

a buffer connected to the touch sensing line to drive a capacitor of the touch electrode with a driving current corresponding to a difference voltage between a voltage of the parasitic capacitor, having an amount of an electric charge controlled by the electric charge controller when a touch does not occur, and a voltage of the parasitic capacitor having an amount of an electric charge controlled by the electric charge controller when a touch occurs, and to output a touch voltage of the capacitor based on the driving current as a first current and a second current;

a current mirror unit generating an output signal from a first mirror current generated by mirroring the first current and a second mirror current generated by mirroring the second current; and an integrator integrating a difference between a reference signal and the output signal to output an integral signal.

10. The touch sensing device of claim 9, wherein the buffer comprises:

an operational amplifier including an inverting input terminal, a noninverting input terminal, and a first output terminal connected to the inverting input terminal; and an output circuit including a pull-up circuit disposed between a first power line and a first output terminal to allow the first current to flow and a pull-down circuit disposed between the first output terminal and a second power line to allow the second current to flow.

11. The touch sensing device of claim 9, wherein the current mirror unit comprises:

a first mirror current generating circuit disposed between a first power line and a second output terminal to generate the first mirror current by performing a mirroring operation on the first current; and a second mirror current generating circuit disposed between the second output terminal and a second power line to generate the second mirror current by performing a mirroring operation on the second current;

the output signal corresponding a difference between the first mirror current and the second mirror current is output through the second output terminal.

12. The touch sensing device of claim 9, wherein the first mirror current is 1/K (where K is an integer of 2 or more) times the first current and the second mirror current is 1/K times the second current.

13. The touch sensing device of claim 9, wherein the electric charge controller comprises a current source connected to the touch sensing line to charge the parasitic capacitor of the touch electrode connected to the touch sensing line with the predetermined charging current during a charging period, and during a first driving period, the buffer is connected to the touch sensing line to drive the capacitor of the touch electrode with a first driving current corresponding to a difference voltage between a first voltage, charged into the parasitic capacitor by the current source when a touch does not occur, and a second voltage charged into the parasitic capacitor by the current source when a touch occurs, and during a sensing period, the buffer outputs a first touch voltage of the capacitor based on the first driving current as the first current and the second current.

14. The touch sensing device of claim 13, wherein the electric charge controller further comprises a current sink connected to the touch sensing line to discharge the parasitic capacitor by using the predetermined discharging current during a discharging period after the first sensing period, and during a second driving period, the buffer is connected to the touch sensing line to drive the capacitor with a second driving current corresponding to a difference voltage between a third voltage of the parasitic capacitor discharged by the current sink when a touch does not occur, and a fourth voltage of the parasitic capacitor discharged by the current sink when a touch occurs, and during a second sensing period, the buffer outputs a second touch voltage of the capacitor based on the second driving current as the first current and the second current.

15. The touch sensing device of claim 14, wherein an amount of the charging current is determined as a value allowing a voltage of the parasitic capacitor to become the first voltage during the charging period, and an amount of the discharging current is determined as a value allowing a voltage of the parasitic capacitor to become the third voltage having a level lower than a level of the first voltage during the discharging period.

16. A touch sensing device of a current driving type, the touch sensing device comprising:

a plurality of electric charge controllers respectively connected to a corresponding touch sensing line among a plurality of touch sensing lines to charge a parasitic capacitor of a touch electrode connected to the corresponding touch sensing line with a predetermined charging current or discharge the parasitic capacitor by using a predetermined discharging current to control an amount of an electric charge of the parasitic capacitor;

a plurality of buffers respectively connected to the corresponding touch sensing line among the plurality of touch sensing lines to drive a capacitor of the touch electrode connected to the corresponding touch sensing line with a driving current corresponding to a difference voltage between a voltage of the parasitic capacitor of the touch electrode, having an amount of an electric charge controlled by a corresponding electric charge controller when a touch does not occur, and a voltage of the parasitic capacitor of the touch electrode having an amount of an electric charge controlled by the corresponding electric charge controller when a touch occurs, and to output a touch voltage of the capacitor based on the driving current as a first current and a second current;

a plurality of current mirror units respectively connected to a corresponding buffer among the plurality of buffers to each generate a first output signal from a first mirror current generated by mirroring the first current output from the corresponding buffer and a second mirror current generated by mirroring the second current output from the corresponding buffer and generate a second output signal from a third mirror current generated by mirroring the first current output from the corresponding buffer and a fourth mirror current generated by mirroring the second current output from the corresponding buffer; and a plurality of integrators adapted to integrate a difference between a second output signal output from an n-1$^{th}$ (where n is an integer of 2 or more) current mirror unit of the plurality of current mirror units and a first output signal output from an n$^{th}$ current mirror unit of the plurality of current mirror units to output an integral signal.

17. The touch sensing device of claim 16, wherein each of the plurality of current mirror units comprises:

a first mirror current generating circuit disposed between a first power line and a second output terminal to generate the first mirror current by performing a mirroring operation on the first current output from the corresponding buffer connected to the corresponding touch sensing line;

a second mirror current generating circuit disposed between the second output terminal and a second power line to generate the second mirror current by performing a mirroring operation on the second current output from the corresponding buffer connected to the corresponding touch sensing line;

a third mirror current generating circuit disposed between the firsts power line and a third output terminal to generate the third mirror current by performing a mirroring operation on the first current output from the corresponding buffer connected to the corresponding touch sensing line; and a fourth mirror current generating circuit disposed between the second power line and the third output terminal to generate the fourth mirror current by performing a mirroring operation on the second current output from the corresponding buffer connected to the corresponding touch sensing line, the first output signal corresponding a difference between the first mirror current and the second mirror current is output through the second output terminal, and the second output signal corresponding to a difference between the third mirror current and the fourth mirror current is output through the third output terminal.

18. The touch sensing device of claim 16, wherein a first integrator of the plurality of integrators integrates a difference between a predetermined reference signal and a first output signal output from a first current mirror unit of the plurality of current mirror units, and a last integrator of the plurality of integrators integrates a difference between the predetermined reference signal and a second output signal output from a last current mirror unit of the plurality of current mirror units.

19. The touch sensing device of claim 16, wherein each of the plurality of electric charge controllers comprises a current source connected to the corresponding touch sensing line to charge the parasitic capacitor of the touch electrode connected to the corresponding touch sensing line with the predetermined charging current during a charging period, and during a first driving period, each of the plurality of buffers is connected to the corresponding touch sensing line to drive the capacitor of the touch electrode connected to the corresponding touch sensing line with a first driving current corresponding to a difference voltage between a first voltage, charged into the parasitic capacitor of the touch electrode by the current source when a touch does not occur, and a second voltage charged into the parasitic capacitor of the touch electrode by the current source when a touch occurs, and during a sensing period, each of the plurality of buffers outputs a first touch voltage of the capacitor based on the first driving current as the first current and the second current.

20. The touch sensing device of claim 16, wherein each of the plurality of electric charge controllers comprises a current sink connected to the corresponding touch sensing line to discharge the parasitic capacitor of the touch electrode connected to the corresponding touch sensing line by using the predetermined discharging current during a discharging period after the first sensing period, and during a second driving period, each of the plurality of buffers is connected to the corresponding touch sensing line to drive the capacitor of the touch electrode connected to the corresponding touch sensing line with a second driving current corresponding to a difference voltage between a third voltage of the parasitic capacitor of the touch electrode discharged by the current sink when a touch does not occur, and a fourth voltage of the parasitic capacitor discharged by the current sink when a touch occurs, and during a second sensing period, each of a plurality of buffers outputs a second touch voltage of the capacitor based on the second driving current as the first current and the second current.

\* \* \* \* \*